US012777430B2

(12) United States Patent
Yuan et al.

(10) Patent No.: US 12,777,430 B2
(45) Date of Patent: Oct. 27, 2026

(54) MULTI-PANEL POWER REPORTING TECHNIQUES

(71) Applicant: QUALCOMM INCORPORATED, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 17/915,979

(22) PCT Filed: Jun. 5, 2020

(86) PCT No.: PCT/CN2020/094543
§ 371 (c)(1),
(2) Date: Sep. 29, 2022

(87) PCT Pub. No.: WO2021/243674
PCT Pub. Date: Dec. 9, 2021

(65) Prior Publication Data

US 2023/0156627 A1 May 18, 2023

(51) Int. Cl.
*H04W 52/36* (2009.01)
*H04W 24/08* (2009.01)

(52) U.S. Cl.
CPC ......... *H04W 52/365* (2013.01); *H04W 24/08* (2013.01); *H04W 52/367* (2013.01)

(58) Field of Classification Search
CPC .. H04W 52/365; H04W 24/08; H04W 52/367
See application file for complete search history.

(56) References Cited

U.S. PATENT DOCUMENTS

| | | | | |
|---|---|---|---|---|
| 8,583,160 | B2 | 11/2013 | Gaal et al. | |
| 2016/0270007 | A1* | 9/2016 | Dinan | H04W 52/242 |
| 2019/0230519 | A1* | 7/2019 | Xu | H04W 64/00 |
| 2019/0387409 | A1 | 12/2019 | Thangarasa et al. | |
| 2019/0394732 | A1* | 12/2019 | Loehr | H04L 25/0224 |
| 2020/0067590 | A1* | 2/2020 | Wang | H04B 7/0632 |

(Continued)

FOREIGN PATENT DOCUMENTS

| | | | |
|---|---|---|---|
| CN | 109219127 | A | 1/2019 |
| CN | 110536397 | A | 12/2019 |

(Continued)

OTHER PUBLICATIONS

Qualcomm Incorporated: "Power Control and PHR for NR", 3GPP TSG RAN WG1 Meeting NR#3, R1-1716451, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 12, 2017, pp. 1-5, XP051330039, Section 3.

(Continued)

*Primary Examiner* — Charles N Appiah
*Assistant Examiner* — Nicole M Louis-Fils
(74) *Attorney, Agent, or Firm* — Holland & Hart LLP

(57) ABSTRACT

Methods, systems, and devices for wireless communications are described. A user equipment (UE) may communicate via a first panel of the UE and a second panel of the UE. The UE may determine at least one of a first power headroom value for the first panel or a second power headroom value for the second panel, the first power headroom value being specific to the first panel and the second power headroom value being specific to the second panel. The UE may transmit, to a base station, a report indicating at least one of the first power headroom value for the first panel or the second power headroom value for the second panel. In some examples, the base station may receive the report and transmit a signal indicating a power adjustment for at least one of the first panel or the second panel in response to receiving the report.

21 Claims, 17 Drawing Sheets

(56) References Cited

U.S. PATENT DOCUMENTS

| | | | |
|---|---|---|---|
| 2020/0162133 | A1 | 5/2020 | Harrison et al. |
| 2020/0186304 | A1 | 6/2020 | Khoshnevisan et al. |
| 2021/0282143 | A1 | 9/2021 | Lee et al. |
| 2021/0377876 | A1* | 12/2021 | Jeon ...................... H04W 24/08 |
| 2022/0174609 | A1* | 6/2022 | Kang .................... H04W 52/42 |
| 2022/0217654 | A1* | 7/2022 | Kang .................. H04W 52/346 |
| 2022/0232486 | A1* | 7/2022 | Caporal Del Barrio ..................... H04B 17/373 |
| 2022/0322248 | A1 | 10/2022 | Gao et al. |
| 2022/0394631 | A1* | 12/2022 | Yang ................... H04W 52/241 |

FOREIGN PATENT DOCUMENTS

| | | | |
|---|---|---|---|
| CN | 111052627 | A | 4/2020 |
| EP | 3214875 | A2 | 9/2017 |
| WO | WO-2010129610 | A2 | 11/2010 |
| WO | WO-2019069132 | A1 | 4/2019 |
| WO | WO-2019169590 | A1 | 9/2019 |
| WO | WO-2020032657 | A1 | 2/2020 |

OTHER PUBLICATIONS

Supplementary European Search Report—EP20938894—Search Authority—Munich—Feb. 14, 2024.

Huawei, et al., "Detailed Considerations on UL Power Control Design for NR", 3GPP TSG RAN WG1 Meeting #89, R1-1706930, XP051263392, Hangzhou, China May 15-19, 2017, May 8, 2017 (May 8, 2017) Sections 2.2. 2.7, 5 Pages.

International Search Report and Written Opinion—PCT/CN2020/094543—ISA/EPO—Feb. 24, 2021.

* cited by examiner

MULTI-PANEL POWER REPORTING TECHNIQUES

CROSS REFERENCE

The present application is a 371 national stage filing of International PCT Application No. PCT/CN2020/094543 by YUAN et al. entitled "MULTI-PANEL POWER REPORTING TECHNIQUES," filed Jun. 5, 2020, which is assigned to the assignee hereof, and which is expressly incorporated by reference in its entirety herein.

FIELD OF TECHNOLOGY

The following relates generally to wireless communications and more specifically to multi-panel power reporting techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station in a wireless communications system, for example, using one or more uplink transmissions. In some cases, conventional techniques for power management at the UE may be deficient. For example, the UE may be unable to accurately report a power usage for uplink transmissions, which may result in relatively poor power management or inefficient communications in the system.

SUMMARY

The described techniques relate to improved methods, systems, devices, and apparatuses that support multi-panel power reporting techniques. Generally, the described techniques provide for multi-panel power headroom reports in a wireless communications system, which may enable devices in a system to accurately indicate power capabilities, more efficiently schedule communications, or enhance power management, among other benefits. For example, a user equipment (UE) may communicate with a base station using multiple panels (e.g., a first panel and a second panel). The UE may determine one or more panel specific power headroom values. For example, the UE may calculate a first power headroom value for the first panel. The UE may additionally or alternatively calculate a second power headroom value for the second panel. The UE may transmit a power headroom report indicating the one or more panel specific power headroom values. In some examples, the UE may transmit the power headroom report based on identifying that one or more thresholds associated with the power headroom report are satisfied. For example, the UE may determine that a timer associated with the power headroom report has expired, that one or more power backoff metrics satisfy one or more thresholds, that a medium access control (MAC) entity has uplink resources for an uplink transmission, or any combination thereof. In some examples, the power headroom report may include one or more fields indicating the panel specific power headroom values, whether the first power headroom value for the first panel is included in the report, whether the second power headroom value for the second panel is included in the report, or any combination thereof, among other examples of fields as described herein.

A method of wireless communications at a UE is described. The method may include communicating via a first panel of the UE and a second panel of the UE, determining at least one of a first power headroom value for the first panel or a second power headroom value for the second panel, the first power headroom value being specific to the first panel and the second power headroom value being specific to the second panel, and transmitting, to a base station, a report indicating at least one of the first power headroom value for the first panel or the second power headroom value for the second panel.

An apparatus for wireless communications at a UE is described. The apparatus may include a processor, memory coupled with the processor, and instructions stored in the memory. The instructions may be executable by the processor to cause the apparatus to communicate via a first panel of the UE and a second panel of the UE, determine at least one of a first power headroom value for the first panel or a second power headroom value for the second panel, the first power headroom value being specific to the first panel and the second power headroom value being specific to the second panel, and transmit, to a base station, a report indicating at least one of the first power headroom value for the first panel or the second power headroom value for the second panel.

Another apparatus for wireless communications at a UE is described. The apparatus may include means for communicating via a first panel of the UE and a second panel of the UE, determining at least one of a first power headroom value for the first panel or a second power headroom value for the second panel, the first power headroom value being specific to the first panel and the second power headroom value being specific to the second panel, and transmitting, to a base station, a report indicating at least one of the first power headroom value for the first panel or the second power headroom value for the second panel.

A non-transitory computer-readable medium storing code for wireless communications at a UE is described. The code may include instructions executable by a processor to communicate via a first panel of the UE and a second panel of the UE, determine at least one of a first power headroom value for the first panel or a second power headroom value for the second panel, the first power headroom value being specific to the first panel and the second power headroom value being specific to the second panel, and transmit, to a base station, a report indicating at least one of the first power headroom value for the first panel or the second power headroom value for the second panel.

A method of wireless communications at a base station is described. The method may include communicating with a first panel of a UE and a second panel of the UE and receiving, from the UE, a report indicating at least one of a first power headroom value for the first panel or a second power headroom value for the second panel, the first power headroom value being specific to the first panel and the second power headroom value being specific to the second panel.

An apparatus for wireless communications at a base station is described. The apparatus may include a processor, memory coupled with the processor, and instructions stored in the memory. The instructions may be executable by the processor to cause the apparatus to communicate with a first panel of a UE and a second panel of the UE and receive, from the UE, a report indicating at least one of a first power headroom value for the first panel or a second power headroom value for the second panel, the first power headroom value being specific to the first panel and the second power headroom value being specific to the second panel.

Another apparatus for wireless communications at a base station is described. The apparatus may include means for communicating with a first panel of a UE and a second panel of the UE and receiving, from the UE, a report indicating at least one of a first power headroom value for the first panel or a second power headroom value for the second panel, the first power headroom value being specific to the first panel and the second power headroom value being specific to the second panel.

A non-transitory computer-readable medium storing code for wireless communications at a base station is described. The code may include instructions executable by a processor to communicate with a first panel of a UE and a second panel of the UE and receive, from the UE, a report indicating at least one of a first power headroom value for the first panel or a second power headroom value for the second panel, the first power headroom value being specific to the first panel and the second power headroom value being specific to the second panel.

DETAILED DESCRIPTION

Figure 1:
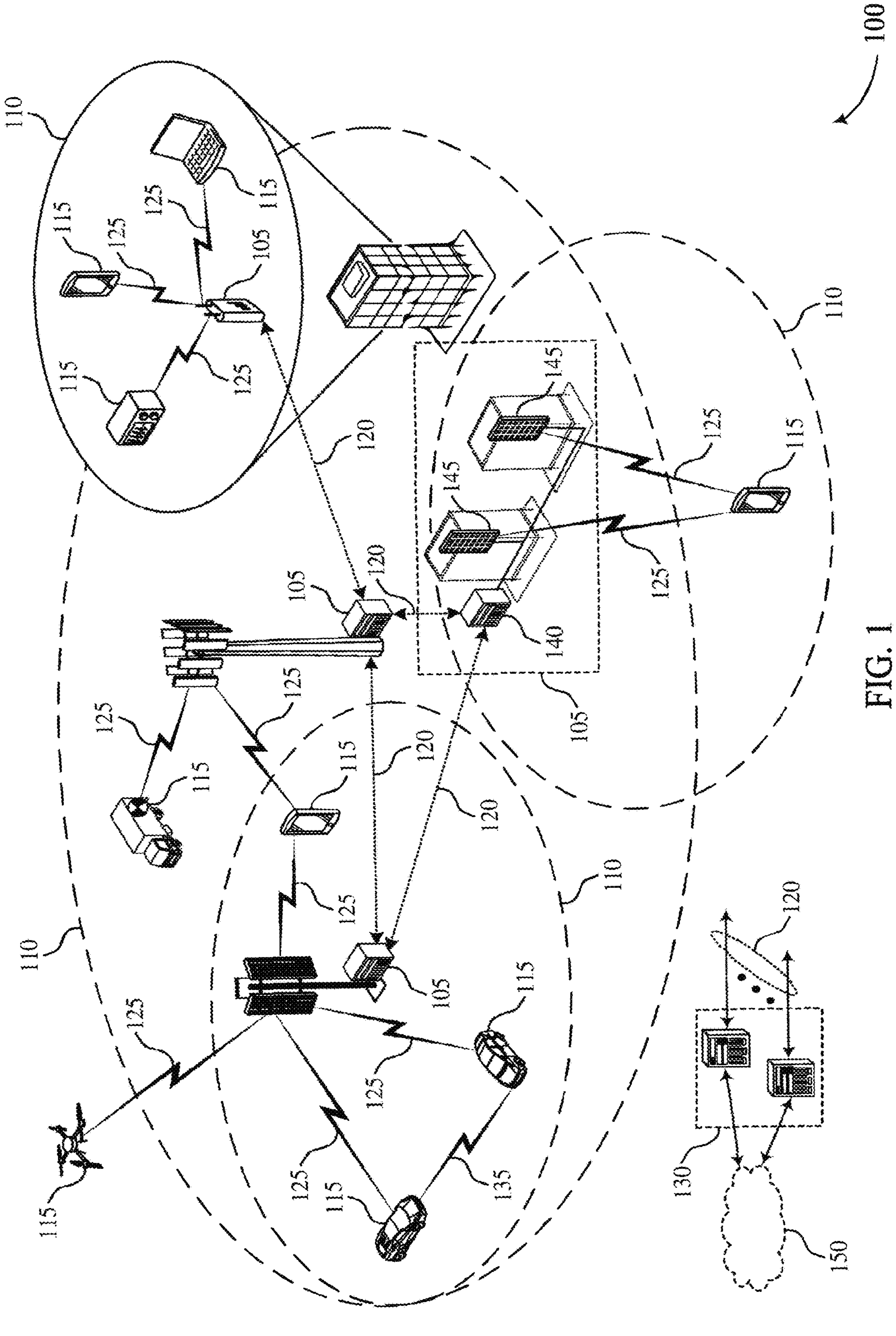
FIG. 1 illustrates an example of a system for wireless communications that supports multi-panel power reporting techniques in accordance with aspects of the present disclosure.

Some wireless communications systems may support multi-panel communications between a user equipment (UE) and a base station. As an illustrative example, the UE may use a first panel for uplink transmissions to the base station, a second panel for uplink transmissions to a base station, etc. In some conventional systems, a UE may transmit a power headroom report (PHR) to a base station which indicates the difference between the maximum transmit power and the currently used transmit power at the UE. However, different panels may be associated with different power usages, channel conditions, etc. For example, a first panel of the UE may experience a maximum permissible exposure (MPE) event (e.g., a person may be within a threshold power exposure for a transmission using the first panel) and the power of the first panel may be reduced. Conventional power headroom reporting techniques do not consider power management of multiple panels (e.g., the reports may indicate a power headroom of the UE as a whole). Such techniques may result in relatively poor system performance. For example, the UE may be unable to accurately report power headroom values for different panels or the base station may be unaware of the MPE event, which may result in inefficient communications or relatively poor power management (e.g., the base station may schedule data above a threshold of the reduced power for the first panel, the base station may fail to allocate resources to a second panel capable of using more power, among other examples).

In accordance with the techniques described herein, a wireless communications system may implement multi-panel power headroom reports for communications between device, which may enable the devices to accurately indicate power capabilities, more efficiently schedule communications, or enhance power management, among other benefits. For example, a UE may communicate with a base station using a first panel and a second panel (e.g., a first antenna panel and a second antenna panel). The UE may determine one or more panel specific power headroom values to report to the base station. For example, the UE may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE may calculate a second power headroom value for the second panel (e.g., using one or more panel specific parameters, such as a maximum transmit power parameter associated with the second panel, a maximum power reduction parameter associated with the second panel, etc.).

The UE may transmit a power headroom report indicating the one or more panel specific power headroom values. In some examples, the UE may transmit the power headroom report based on identifying that one or more thresholds associated with the power headroom report are satisfied. For example, the UE may determine that a timer associated with the power headroom report has expired, that one or more power backoff metrics satisfy one or more thresholds (e.g., a change in a power backoff metric for the first panel, the second panel, or both may satisfy a change threshold), that a medium access control (MAC) entity has uplink resources for an uplink transmission, or any combination thereof. The power headroom report may include one or more fields indicating the panel specific power headroom values. For example, the UE may populate one or more fields of the report, the one or more fields indicating whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields.

Aspects of the disclosure are initially described in the context of wireless communications systems. Aspects of the disclosure are then described in the context of resource schemes and process flows. Aspects of the disclosure are further illustrated by and described with reference to apparatus diagrams, system diagrams, and flowcharts that relate to multi-panel power reporting techniques.

FIG. 1 illustrates an example of a wireless communications system 100 that supports multi-panel power reporting techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 may support multi-panel communications between a UE 115 and a base station 105. As an illustrative example, the UE may use a first panel to communicate with a first TRP associated with the base station 105, a second panel to communicate with a second TRP associated with the base station 105, etc. In some examples, different panels of the UE 115 may be associated with different parameters (e.g., power parameters), conditions (e.g., one or more panels may experience an MPE event), etc.

In accordance with the techniques described herein, the wireless communications system 100 may implement multi-panel power headroom reports for communications between devices, which may enable the devices to accurately indicate power capabilities, more efficiently schedule communications, or enhance power management, among other benefits. For example, a UE 115 may communicate with a base station 105 using a first panel and a second panel (e.g., a first antenna panel and a second antenna panel). The UE 115 may determine one or more panel specific power headroom values to report to the base station 105. For example, the UE 115 may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE 115 may calculate a second power headroom value for the second panel (e.g., using one or more panel specific parameters, such as a maximum transmit power parameter associated with the second panel, a maximum power reduction parameter associated with the second panel, etc.).

The UE 115 may transmit a power headroom report indicating the one or more panel specific power headroom values. In some examples, the UE 115 may transmit the power headroom report based on identifying that one or more thresholds associated with the power headroom report are satisfied. For example, the UE 115 may determine that a timer associated with the power headroom report has expired, that one or more power backoff metrics satisfy one or more thresholds (e.g., a change in a power backoff metric for the first panel, the second panel, or both may satisfy a change threshold), that a medium access control (MAC) entity has uplink resources for an uplink transmission, or any combination thereof. The power headroom report may include one or more fields indicating the panel specific power headroom values. For example, the UE 115 may populate one or more fields of the report, the one or more fields indicating whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields.

Figure 2:
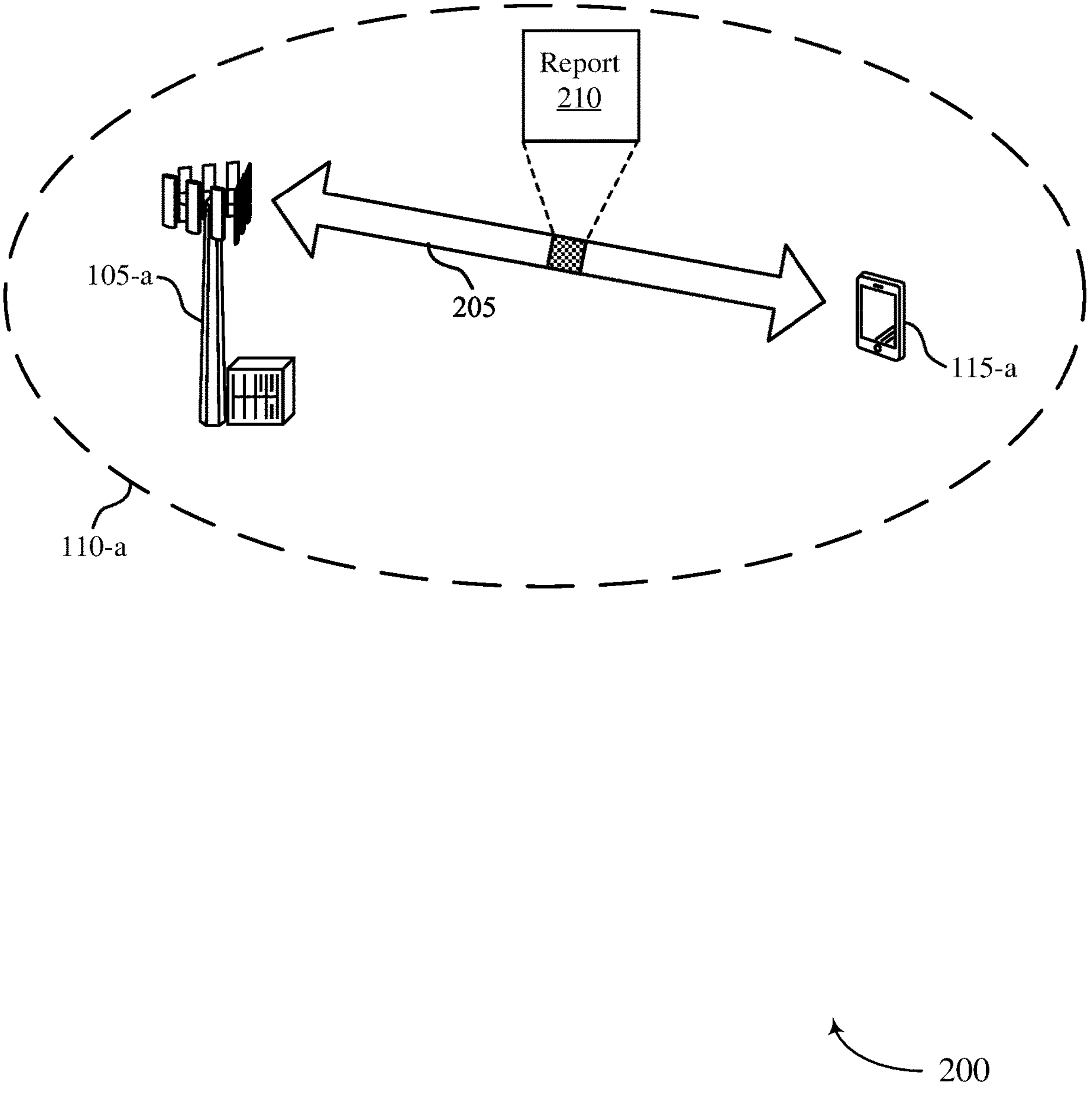
FIG. 2 illustrates an example of a wireless communications system that supports multi-panel power reporting techniques in accordance with aspects of the present disclosure.

FIG. 2 illustrates an example of a wireless communications system 200 that supports multi-panel power reporting techniques in accordance with aspects of the present disclosure. In some examples, the wireless communications system 200 may implement aspects of wireless communication system 100. For example, the wireless communications system 200 may include UE 115-*a* and base station 105-*a*, which may be examples of a UE 115 and a base station 105 as described with reference to FIG. 1.

The wireless communications system 200 may support multi-panel communications 205 between the UE 115-*a* and the base station 105-*a* in a geographic area 110-*a*. As an illustrative example, the UE 115-*a* may send uplink transmissions using a first panel (e.g., a first set of antennas of the first panel) to the base station 105-*a*, a second panel (e.g., a second set of antennas of the second panel) to the base station 105-*a*, or both.

In some examples, the UE 115-*a* may implement power management techniques (e.g., power control for uplink transmissions, such as physical uplink shared channel transmissions using one or more panels). For example, the UE 115-*a* may transmit a report 210 to the base station 105-*a* indicating a power headroom of the UE 115-*a*. For example, the UE 115-*a* may determine the power headroom as a difference between the maximum transmit power of the UE 115-*a* and a transmit power of the UE 115-*a* (e.g., a currently used transmit power, a predicted transmit power, among other examples).

In some examples, the UE 115-*a* may calculate the transmit power of the UE 115-*a*. For example, the UE 115-*a* may calculate a real transmission power based on one or more configured values (e.g., configured by the base station 105-*a*, pre-configured at the UE 115-*a*, or a combination thereof), a resource assignment from the base station 105-*a*, among other examples of factors for calculating a transmit power. As an illustrative example, the UE 115-*a* may calculate a real transmission power "$P_{PUSCH}(i,j,q_d,l)$" using Equation 1:

$$P_{PUSCH}(i, j, q_d, l) = P_{o_{PUSCH},b,f,c}(j) + 10\log_{10}\left(2^{\mu} M_{RB,b,f,c}^{PUSCH}(i)\right) + \alpha_{b,f,c}(j) PL_{b,f,c}(q_d) + \Delta_{TF,b,f,c}(i) + f_{b,f,c}(i, l) \quad (1)$$

In Equation 1, the $P_{o_{PUSCH},b,f,c}$(j) may represent a target signal to noise ratio (SINR) (e.g., set by a $P_0$ value of a configuration of the UE 115-*a*), the $$M_{RB,b,f,c}^{PUSCH}(i)$$

may represent the bandwidth of a physical uplink shared channel (PUSCH) resource assignment (e.g., expressed in a number of resource blocks for a scheduled PUSCH transmission), the $\alpha_{b,f,c,}$(j) may represent a path loss compensation factor, the $PL_{b,f,c}(q_d)$ may represent a path loss reference (e.g., which may be referred to as "RS"), the $\Delta_{TF,b,f,c}$(i) may represent a modulation and coding scheme (MCS) related adjustment (e.g., the power may depend on an MCS scheme associated with PUSCH transmission), and the $f_{b,f,c}$(i,l) may represent the a PUSCH power control adjustment state. In some examples, the various factors used to calculate the real transmission power may be configured at the UE 115-*a* (e.g., via RRC signaling, pre-configured values at the UE 115-*a*, etc.), or the UE 115-*a* may otherwise determine the factors (e.g., based on control information from the base station 105-*a*, or other methods of determination). For example, the parameters i, j, $q_d$, l may be default parameters or may be signaled parameters, or a combination thereof.

In some examples, the UE 115-*a* may calculate a virtual transmission power based on one or more configured values (e.g., one or more default parameters configured to use as values for i, j, $q_d$, l). As an illustrative example, the UE 115-*a* may calculate a virtual transmission power "$P_{PUSCH}$(i, $q_d$, l)" using Equation 2:

$$P_{PUSCH}(i, j, q_d, l) = P_{o_{PUSCH},b,fc}(j) + \alpha_{b,f,c,}(j) PL_{b,fc}(q_d) + f_{b,fc}(i, l) \quad (2)$$

In some examples, the maximum transmit power (e.g., a configured UE maximum output power $PCMAX_{f,c}$ for a carrier "f" of a serving cell "c") may be set such that a corresponding measurement satisfies a threshold. For example, the maximum transmit power may be set such that a measured peak of an effective isotropically radiated power (EIRP) (e.g., which may be referred to as "$PUMAX_{f,c}$") is within bounds illustrated by Equation 3:

$$EIRPmax \geq PUMAX_{,f,c} \geq P_{Powerclass} - \mathrm{MAX}(\mathrm{MAX}(MPR_{,f,c}), +\Delta MBP_n, P - MPR_{,f,c}) - \mathrm{MAX}\{T(\mathrm{MAX}(MPR_{,f,c}, A - MPR_{,f,c},)), T(P - MPR_{,f,c})\} \quad (3)$$

In some examples, the various factors used in Equation 3 may be configured at the UE 115-*a* (e.g., via RRC signaling, pre-configured values at the UE 115-*a*, etc.), or the UE 115-*a* may otherwise determine the factors (e.g., based on control information from the base station 105-*a*, or other methods of determination). The P-$MPR_{f,c}$ may represent an allowed maximum output power reduction configured at the UE 115-*a*. In some examples, the P-$MPR_{f,c}$ may be referred to as power management maximum power reduction parameter.

In some examples, the UE 115-*a* may apply the maximum output power reduction for a carrier f of a serving cell c for one or more cases. For example, the UE 115-*a* may apply the maximum output power reduction to ensure compliance with applicable electromagnetic power density exposure thresholds, addressing unwanted emissions, self-defence requirements in the event of simultaneous transmissions on multiple radio access technologies, ensuring compliance with the applicable electromagnetic power density exposure thresholds in the case that proximity detection is used to address such thresholds that may result in a lower maximum output power, or any combination thereof.

In some examples, the UE 115-*a* may report one or more parameters (e.g., the available maximum output transmit power) to the base station 105-*a* in the report 210. The base station 105-*a* may perform scheduling based on the report 210. For example, the base station 105-*a* may allocate resources to the UE 115-*a* based on the report 210 (e.g., the base station 105-*a* may increase resources and an associated data rate if the report 210 includes a power headroom with a positive value indicating that the UE 115-*a* may use more power and transmit more data, the base station 105-*a* may reduce resources and an associated data rate if the report 210 includes a power headroom with a negative value indicating that the UE 115-*a* is using more than a threshold amount of power, etc.), among other examples of scheduling decisions. Additionally or alternatively, the base station 105-*e* may transmit a signal indicating a power adjustment for one or more of the panels based on the report. In some examples, the parameters (e.g., the P-$MPR_{f,c}$ and a maxUplinkDutyCycle-FR2 parameters) may impact a maximum uplink performance for a selected uplink transmission path.

In some examples, the wireless communications system 200 may support multi-panel power headroom indications. For example, the report 210 may be an example of a multi-panel power headroom report (e.g., the report 210 may indicate a power headroom value for a first panel for a carrier f of a serving cell c, the report 210 may indicate a power headroom value for a second panel for a carrier f of a serving cell c, etc.). Such reports 210 may enable the devices of the memory system 200 to accurately indicate power capabilities, more efficiently schedule communications, or enhance power management, among other benefits. For example, the UE 115-*a* may communicate with a base station 105-*a* using a first panel and a second panel (e.g., a first antenna panel and a second antenna panel). The UE 115-*a* may determine one or more panel specific power headroom values to report to the base station 105-*a*. For example, the UE 115-*a* may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE 115-*a* may calculate a second power headroom value for the second panel (e.g., using one or more panel specific parameters, such as a maximum transmit power parameter associated with the second panel, a maximum power reduction parameter associated with the second panel, etc.).

The UE 115-*a* may transmit a power headroom report 210 indicating the one or more panel specific power headroom values. In some examples, the UE 115-*a* may transmit the power headroom report 210 based on identifying that one or more thresholds associated with the power headroom report 210 are satisfied. For example, the UE 115-*a* may determine that a timer associated with the power headroom report 210 has expired, that one or more power backoff metrics satisfy one or more thresholds (e.g., a change in a power backoff metric for the first panel, the second panel, or both may satisfy a change threshold), that a MAC entity has uplink resources for an uplink transmission, or any combination thereof. The power headroom report 210 may include one or more fields indicating the panel specific power headroom values. For example, the UE 115-*a* may populate one or more fields of the report 210, the one or more fields indicating whether the first power headroom value for the first panel is included in the report 210, whether the second power headroom value for the second panel is included in the report 210, whether a MAC entity applies power management techniques, whether a panel specific power headroom value is based on a real transmission format or a virtual transmission format, or any combination thereof, among other examples of fields of the report 210.

Figure 3:
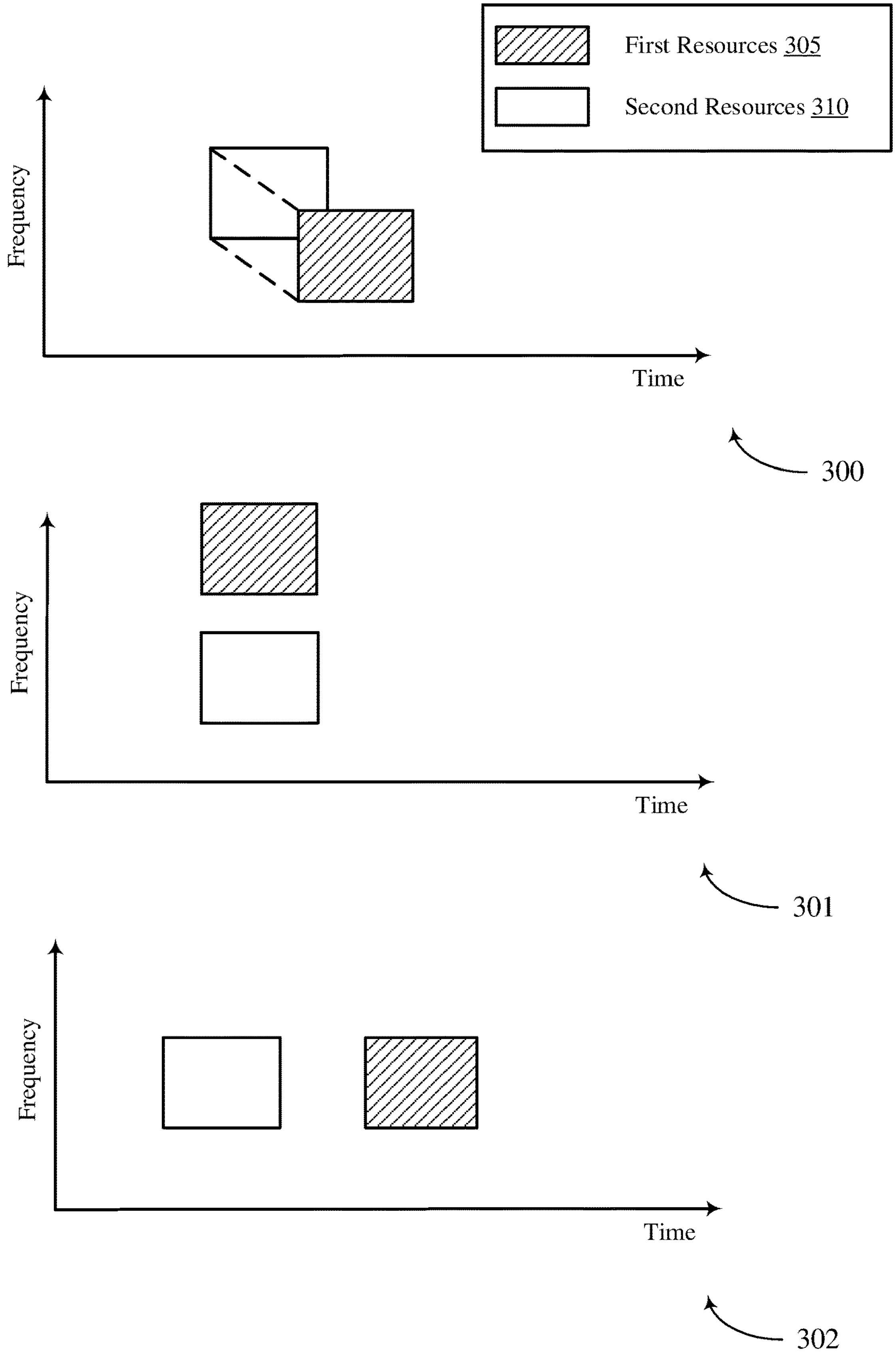
FIG. 3 illustrates examples of resource schemes that support multi-panel power reporting techniques in accordance with aspects of the present disclosure.

FIG. 3 illustrates examples of resource schemes 300, 301, and 302 that support multi-panel power reporting techniques in accordance with aspects of the present disclosure. In some examples, the various resource schemes in FIG. 3 may implement aspects of wireless communication systems 100 or 200. For example, the resource schemes 300, 301, and 302 may illustrate examples of multi-panel communications between a UE 115 and a base station 105, as described with reference to FIGS. 1 and 2.

For example, the various resource schemes may include first resources 305 and second resources 310. The first resources 305 may be an example of uplink resources associated with a first panel (e.g., PUSCH resources for uplink transmission via the first panel). As an illustrative example, the first resources may correspond to a first set of parameters (e.g., indicated by downlink control information (DCI) associated with a resource assignment). The first set of parameters may include one or more of a first transmitted precoding matrix index (TPMI), a first sounding reference signal (SRS) resource indicator (SRI), a first uplink tag control information (TCI), or any combination thereof, among other examples of parameters associated with a panel. The second resources 310 may be an example of uplink resources associated with a second panel (e.g., PUSCH resources for uplink transmission from the second panel). The second resources 310 may correspond to a second set of parameters (e.g., indicated by DCI associated with a resource assignment). The second set of parameters may include one or more of a second TMPI, a second SRI, a second uplink TCI, or any combination thereof, among other examples of parameters associated with a panel. In some examples, the base station may indicate the first resources 305 and/or the second resources 310 via a resource assignment (e.g., a signal indicating uplink resources for communications via a panel).

The resource scheme 300 may illustrate an example of spatial divisional multiplexing (SDM) for communicating using multiple panels. As an illustrative example, a UE may transmit one or more uplink transmissions using the first panel and the second panel in accordance with SDM communications. The first resources 305 and the second resources 310 may utilize overlapping resources in time and frequency (e.g., the same time frequency resources) but transmit on different spatial beams (e.g., the first panel may use a first focused signal beam in a first spatial configuration and the second panel may use a different second focused signal beam in a second spatial configuration).

The resource scheme 301 may illustrate an example of FDM for communicating using multiple panels. As an illustrative example, a UE may transmit one or more uplink transmissions using the first panel and the second panel in accordance with FDM communications. The first resources 305 and the second resources 310 may utilize overlapping resources in time (e.g., the same time resources) but may transmit on different frequencies (e.g., the first resources 305 may be allocated to a first frequency of a time period and the second resources 310 may be allocated to a second frequency of the time period).

The resource scheme 302 may illustrate an example of TDM for communicating using multiple panels. As an illustrative example, a UE may transmit one or more uplink transmissions using the first panel and the second panel in accordance with TDM communications. The first resources 305 and the second resources 310 may utilize overlapping resources in frequency (e.g., the same frequency band resources) but may transmit at different times (e.g., the first resources 305 may be allocated to a first frequency of a first time period and the second resources 310 may be allocated to a second time period of the first frequency).

In accordance with the techniques described herein, the resource schemes 300, 301, and/or 302 may implement multi-panel power headroom reports for communications between devices, which may enable the devices to accurately indicate power capabilities, more efficiently schedule communications, or enhance power management, among other benefits. For example, a UE 115 may communicate with a base station 105 using a first panel and a second panel (e.g., a first antenna panel and a second antenna panel) in accordance with SDM, FDM, TDM, or any combination thereof. The UE 115 may determine one or more panel specific power headroom values to report to the base station 105. For example, the UE 115 may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE 115 may calculate a second power headroom value for the second panel (e.g., using one or more panel specific parameters, such as a maximum transmit power parameter associated with the second panel, a maximum power reduction parameter associated with the second panel, etc.).

The UE 115 may transmit a power headroom report indicating the one or more panel specific power headroom values. In some examples, the UE 115 may transmit the power headroom report based on identifying that one or more thresholds associated with the power headroom report are satisfied. For example, the UE 115 may determine that a timer associated with the power headroom report has expired, that one or more power backoff metrics satisfy one or more thresholds (e.g., a change in a power backoff metric for the first panel, the second panel, or both may satisfy a change threshold), that a medium access control (MAC) entity has uplink resources for an uplink transmission, or any combination thereof. The power headroom report may include one or more fields indicating the panel specific power headroom values. For example, the UE 115 may populate one or more fields of the report, the one or more fields indicating whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields.

Figure 4:
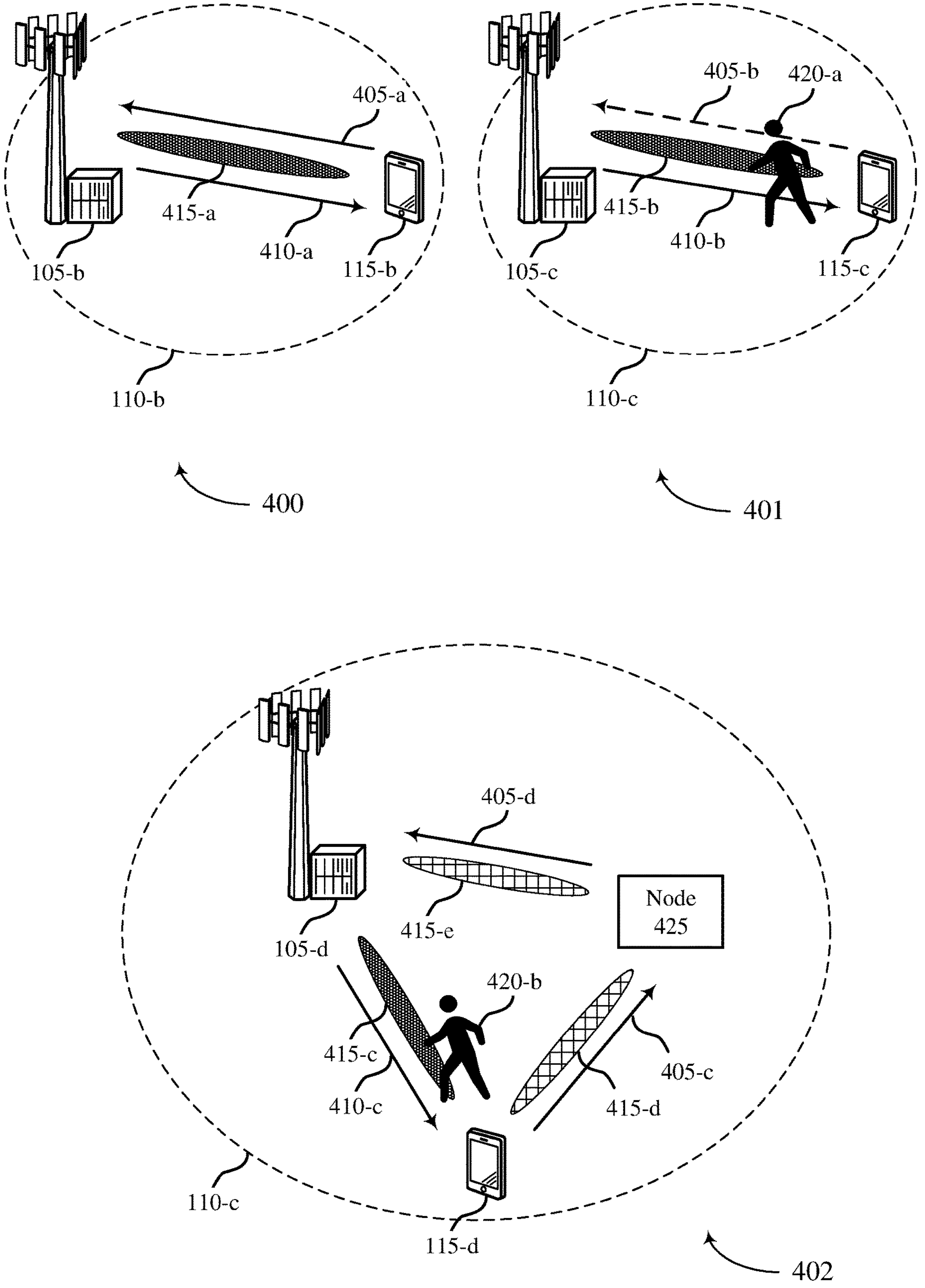
FIG. 4 illustrates examples of wireless communications systems that support multi-panel power reporting techniques in accordance with aspects of the present disclosure.

FIG. 4 illustrates examples of wireless communications systems 400, 401, and 402 that support multi-panel power reporting techniques in accordance with aspects of the present disclosure. In some examples, the various example wireless communications systems of FIG. 4 may implement aspects of wireless communications systems 100 and 200. For example, the wireless communications systems 400, 401, and 402 may include UEs 115 and base stations 105, which may be examples of the corresponding devices as described with reference to FIGS. 1 and 2.

The wireless communications system 400 may illustrate an example of communications between a UE 115-*b* and a base station 105-*b* in a geographic area 110-*b*. The UE 115-*b* and the base station 105-*b* may communicate using a beam 415-*a* (e.g., one or more beams 415-*a* associated with a panel of the UE 115-*b*). For example, the UE 115-*b* may send uplink transmissions 405-*a* using the beam 415-*a* and may receive downlink transmissions 410-*a* from the base station 105-*b* (e.g., using a reception beam of the first panel used to transmit uplink transmissions 405-*a*).

The wireless communications system 401 may illustrate an example of communications between a UE 115-*c* and a base station 105-*c* in a geographic area 110-*c*. Generally, the wireless communications system 401 may illustrate an example of an MPE event. For example, a person 420-*a* (or other objects/conditions) may be in a proximity and/or orientation that satisfies a threshold. As an illustrative example, the person 420-*a* may be located such that the uplink transmission 405-*b*, using a configured power, may exceed a threshold power exposure of the person 420-*a*. In order to ensure that the MPE threshold for the person 420-*a* is satisfied, the UE 115-*c* may be configured to reduce a power of the uplink transmission 405-*b* (e.g., the UE 115-*c* may reduce a power of a first panel associated with a transmit beam 415-*b*). In some examples, the base station 105-*c* may continue to transmit downlink transmissions 410-*b* due to a distance between the base station 105-*c* and the person 420-*a*, a frequency of the downlink transmissions 410-*b*, or both satisfying the MPE threshold. However, such an MPE event may result in relatively inefficient or unreliable communications.

The wireless communications system 402 may illustrate an example of a method to maintain communications with the base station 105-*d* in an MPE event. For example, the UE 115-*d* may continue to receive downlink transmissions 410-*c* from the base station 105-*d* using the beam 415-*c*. Additionally or alternatively, the UE 115-*d* may use a second panel to communicate uplink transmissions 405-*c* to the base station 105-*d*. For example, the UE 115-*d* may include a second panel that is not experiencing an MPE event (e.g., transmission using the beam 415-*d* may satisfy a threshold power exposure of the person 420-*b*, but uplink transmission using a beam 415-*c* may fail to satisfy the threshold and the UE 115-*d* may reduce a power of a first panel for uplink transmissions as described above). The UE 115-*d* may switch from communicating with the first panel to communicating with the second panel in response to the MPE event (e.g., the UE 115-*d* may switch from beam 415-*c* to beam 415-*d* to satisfy a power exposure threshold for uplink transmissions 405-*c*). In other words, downlink communications 410-*c* may be maintained and uplink transmissions 405-*c* may be altered. In some examples, the UE 115-*d* may receive downlink transmissions 410-*c* from a first TRP of the base station 150-*d* and communicate the uplink transmissions 405-*c* with a node 425 (e.g., a second TRP of the base station 150-*d*). Additionally or alternatively, the node may be an example of another base station 105, among other examples of wireless nodes. In some other examples, the UE 115-*d* may send uplink transmissions 405-*c* to the first TRP of the base station 105-*d* using the second beam 415-*d*.

However, in some examples, power reporting techniques may be relatively inefficient. For example, the UE 115-*d* may report a power headroom of the UE 115-*d* but may be unable to report multi-panel power headroom values. In such examples, the UE 115-*d* may be unable to accurately report power headroom values for different panels or the base station 105-*d* may be unaware of the MPE event, which may result in inefficient communications or relatively poor power management. For example, the base station 105-*d* may schedule uplink resources expecting a power of uplink transmissions 405 above a power threshold of the reduced power for the first panel (e.g., in response to the MPE event), the base station 105-*d* may fail to allocate resources to the second panel capable of using more power for uplink transmissions 405-*c* (e.g., resulting in inefficient communications), among other examples.

In accordance with the techniques described herein, the wireless communications systems 400, 401, and/or 402 may implement multi-panel power headroom reports for communications between devices, which may enable the devices to accurately indicate power capabilities, more efficiently schedule communications, or enhance power management, among other benefits. For example, a UE 115 may communicate with a base station 105 using a first panel and a second panel (e.g., a first antenna panel and a second antenna panel) in accordance with SDM, FDM, TDM, or any combination thereof. The UE 115 may determine one or more panel specific power headroom values to report to the base station 105. For example, the UE 115 may calculate a first power headroom value for the first panel (e.g., based on one or more panel specific parameters, such as a maximum transmit power parameter associated with the first panel, a maximum power reduction parameter associated with the first panel, etc.). Additionally or alternatively, the UE 115 may calculate a second power headroom value for the second panel (e.g., using one or more panel specific parameters, such as a maximum transmit power parameter associated with the second panel, a maximum power reduction parameter associated with the second panel, etc.).

The UE 115 may transmit a power headroom report indicating the one or more panel specific power headroom values. In some examples, the UE 115 may transmit the power headroom report based on identifying that one or more thresholds associated with the power headroom report are satisfied. For example, the UE 115 may determine that a timer associated with the power headroom report has expired, that one or more power backoff metrics satisfy one or more thresholds (e.g., a change in a power backoff metric for the first panel, the second panel, or both may satisfy a change threshold), that a medium access control (MAC) entity has uplink resources for an uplink transmission, or any combination thereof. The power headroom report may include one or more fields indicating the panel specific power headroom values. For example, the UE 115 may populate one or more fields of the report, the one or more fields indicating whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields.

Figure 5:
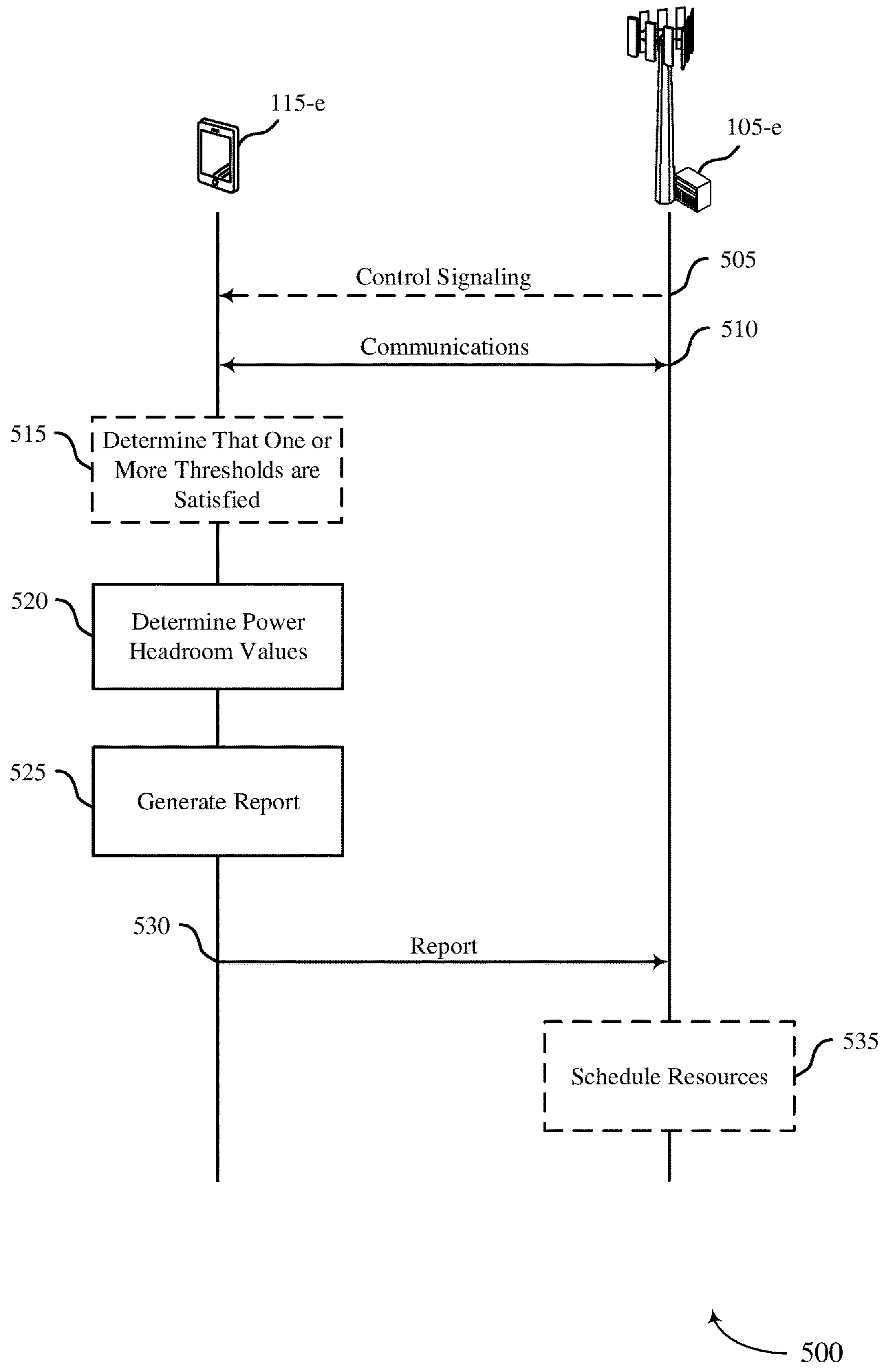
FIG. 5 illustrates an example of a process flow that supports multi-panel power reporting techniques in accordance with aspects of the present disclosure.

FIG. 5 illustrates an example of a process flow 500 that supports multi-panel power reporting techniques in accordance with aspects of the present disclosure. In some examples, the process flow 500 may implement aspects of wireless communications systems 100, 200, 400, 401, 402, or any combination thereof. For example, the process flow 500 may illustrate operations performed by a UE 115-*e* or a base station 105-*e*, which may be examples of the corresponding devices described herein. In some examples, the process flow 500 may illustrate implementation of a multi-panel power headroom report for multi-panel communications between the UE 115-*e* and the base station 105-*e*.

In some examples, at 505, the base station 105-*e* may transmit control signaling to the UE 115-*e*. For example, the base station 105-*e* may send DCI indicating one or more resource assignments for communications with the UE 115-*e* (e.g., the DCI may indicate first resources for an uplink transmission from the UE 115-*e* using a first panel, second resources for an uplink transmissions from the UE 115-*e* using a second panel).

At 510, the UE 115-*e* and the base station 105-*e* may communicate. In some examples, the UE 115-*e* and the base station 105-*e* may communicate using multi-panel communications as described herein, for example, with reference to FIGS. 1-4. As an illustrative example, the UE 115-*e* may send one or more uplink transmissions using one or more panels of the UE 115-*e* (e.g., a first panel and a second panel associated with communications over a carrier).

In some examples, at 515 the UE 115-*e* may determine that one or more threshold are satisfied (e.g., the UE 115-*e* may identify one or more triggers for transmitting a multi-panel power headroom report). For example, the UE 115-*e* may determine that a timer associated with the power headroom report has expired (e.g., the UE 115-*e* may determine that a timer phr-ProhibitTimer has expired and may transmit a report based on the expiration).

Additionally or alternatively, the UE 115-*e* may determine that one or more power backoff metrics satisfy one or more thresholds. As an illustrative example, a UE 115-*e* may include two panels (e.g., a first panel corresponding to a k value of 0 and a second panel corresponding to a k value of 1) and may communicate with the base station 105-*e* using the two panels at 510. The UE 115-*e* may determine that a power headroom report has been triggered, for example, if a change in a power backoff metric associated with at least one of the first panel, the second panel, or both satisfies a threshold. For example, the UE 115-*e* may determine that either one of a power backoff associated with the first panel (e.g., a power management maximum power reduction parameter of the first panel, which may be referred to as P-MPR(1)) or a power backoff associated with the second panel (e.g., a power management maximum power reduction parameter of the second panel, which may be referred to as P-MPR(2)) satisfies a threshold. Additionally or alternatively, the UE 115-*e* may determine that both the power backoff associated with the first panel and the power backoff associated with the second panel satisfy the threshold. Additionally or alternatively, the UE 115-*e* may determine that a sum of the power backoffs of the first panel and the second panel satisfy the threshold.

As an illustrative example, the UE 115-*e* may report a multi-panel power headroom report based on the one or more satisfied thresholds. For example, the power headroom report may be triggered based on detecting an expiration of a timer (e.g., phr-ProhibitTimer has expired), that a MAC entity has uplink resources for a new transmission from the UE 115-*e*, that there are uplink resources allocated for transmission or there is a physical uplink control channel (PUCCH) transmission on a serving cell associated with the first panel and the second panel, and a power backoff (e.g., due to power management, as discussed herein with reference to FIG. 2) for the cell has change more than a threshold associated with the power headroom report (e.g., phr-Tx-PowerFactorChange dB) since a last transmission of a power headroom report when the MAC entity had uplink resources allocated for transmission or PUCCH transmission on the cell, or any combination thereof.

At 520, the UE 115-*e* may determine one or more power headroom values, for example, based on determining that the one or more thresholds are satisfied. For example, the UE 115-*e* may support per panel power headroom calculation at the UE 115-*e* as described herein. The UE 115-*e* may calculate a first power headroom value for a first panel, a second power headroom value for a second panel, or both 9 e.g., among other examples of quantities of panels). As an illustrative example, the UE 115-*e* may calculate panel specific power headroom values for PUSCH transmissions using Equation 4:

$$PH_{type1,b,f,c}(i,\ j,\ q_d,\ l,\ k) = P_{CMAX,f,c}(i,\ k) - P_{k,PUSCH}(i,\ j,\ q_d,\ l) \tag{4}$$

In Equation 1, the $PH_{type1,b,f,c}(i,j,q_d,l,k)$ may represent a type 1 power headroom value for a PUSCH transmission for a panel k (e.g., a first panel may correspond to a panel index k of 0, a second panel may correspond to a panel index k of 1, and so on). The $P_{CMAX,f,c}(i,k)$ may represent a maximum transmit power for a panel k (e.g., configured at the UE 115-*e* as described herein). In some examples, the $P_{CMAX,f,c}(i,k)$ may be the same for multiple panels (e.g., configured as the same for each of the first and second panels). In some other examples, $P_{CMAX,f,c}(i,k)$ may be panel specific. For example, the $P_{CMAX,f,c}(i,k)$ may be based on a power management maximum power reduction parameter for a panel k (e.g., a panel specific P-MPR value represented by P-MPR(k)≥0 may be an example of a panel specific power reduction parameter used to calculate the $P_{CMAX,f,c}(i,k)$). In some examples, the $P_{k,PUSCH}(i,j,q_d,l)$ may represent a panel specific transmission power.

In some examples, the panel specific transmission power may be a real transmission power (e.g., the power headroom report value for a specific panel may be a real transmission power) or the panel specific transmission power may be a virtual transmission power (e.g., the power headroom report value for a specific panel may be a real transmission power). As an illustrative example, the UE 115-*e* may calculate the panel specific transmission power (e.g., for a panel k) as a real transmission power using Equation 5:

$$P_{k,PUSCH}(i,\ j,\ q_d,\ l) = P_{o_{PUSCH}k,b,f,c}(j) + 10\ \log_{10}\left(2^{\mu} M^{PUSCH}_{RB,k,b,f,c}(i)\right) + \alpha_{k,b,f,c}(j) PL_{k,b,f,c}(q_d) + \Delta_{k,TF,b,f,c}(i) + f_{k,b,f,c}(i,\ l) \tag{5}$$

In Equation 5, the $P_{o_{PUSCH}k,b,f,c}(j)$ may represent a target signal to noise ratio (SINR) (e.g., set by a $P_o$ value of a configuration of the UE 115-*a*), the $$M^{PUSCH}_{RB,k,b,f,c}(i)$$

may represent the bandwidth of a PUSCH resource assignment (e.g., expressed in a number of resource blocks for a scheduled PUSCH transmission), the $\alpha_{k,b,f,c}$, (j) may represent a path loss compensation factor, the $PL_{k,b,f,c}(q_d)$ may represent a path loss reference (e.g., which may be referred to as "RS"), the $\Delta_{k,TF,b,f,c}(i)$ may represent a MCS related adjustment (e.g., the power may depend on an MCS scheme associated with PUSCH transmission), and the $f_{k,b,f,c}(i,l)$ may represent the a PUSCH power control adjustment state. In some examples, the various factors used to calculate the real transmission power may be configured at the UE 115-*e* (e.g., via RRC signaling, pre-configured values at the UE 115-*e*, etc.), or the UE 115-*e* may otherwise determine the factors (e.g., based on control information from the base station 105-*e*, or other methods of determination). For example, the parameters i, j, $q_d$, l may be default parameters or may be signaled parameters, or a combination thereof. In some examples, the various parameters in Equation 5 may be panel specific parameters (e.g., each panel k may correspond to an associated set of parameters used to calculate the transmission power), the parameters may be common for multiple panels, or any combination thereof.

In some examples, the UE 115-*e* may calculate a panel specific virtual transmission power based on one or more configured values (e.g., one or more default parameters configured to use as values for i, j, $q_d$, l). As an illustrative example, the UE 115-*a* may calculate a virtual transmission power "$P_{k,PUSCH}(i,j,q_d,l)$" for a panel k using Equation 6:

$$P_{k,PUSCH}(i, j, q_d, l) = P_{oPUSCH,k,b,fc}(j) + \alpha_{k,b,f,c,}(j)PL_{k,b,f,c}(q_d) + f_{k,b,f,c}(i, l) \tag{6}$$

At 525, the UE 115-*e* may generate a report. For example, the UE 115-*e* may populate one or more fields of the report based at least in part on determining the power headroom values at 520. The report may be an example of a multi-panel power headroom report as described herein. For example, the report may include at least one of a first power headroom value for a first panel of the UE 115-*e* or a second power headroom value for a second panel of the UE 115-*e*. In some examples, the one or more fields may indicate whether the first power headroom value for the first panel is included in the report, whether the second power headroom value for the second panel is included in the report, whether a MAC entity applies power management techniques, whether a panel specific power headroom value is based on a real transmission format or a virtual transmission format, or any combination thereof, among other examples of fields. As an illustrative example, the UE 115-*e* may populate the report as shown below in Table 1. Table 1 may illustrate an example report format for the multi-panel power headroom report, for example, where each component carrier is associated with a report (e.g., including two power headroom values, among other examples of quantities of panel-specific power headroom values).

TABLE 1

| R | P1 | P2 | Serving cell index |
|---|---|---|---|
| P | V | | PH(type X, panel 0) |
| R | | | $P_{CMAX,f,c}(0)$ |
| P | V | | PH(type X, panel 1) |
| R | | | $P_{CMAX,f,c}(1)$ |

In Table 1, the P1 field may indicate whether a power headroom report (e.g., a power headroom value) is reported for the first panel. The P2 field may indicate whether a power headroom report (e.g., a power headroom value) is reported for the second panel. The P field may indicate whether the MAC entity applies power backoff due to power management (e.g., whether a P-MPR is implemented, a value of the P-MPR, or both). The V field may indicate if the power headroom value is based on a real transmission format or a virtual transmission reference format. In some examples, the V field may be set to 0 indicating a real transmission format and the presence of an octet including the associated $P_{CMAX,f,c}$ field for a panel k, or the V field may be set to 1 indicating that a virtual transmission reference format and the octet including the associated $P_{CMAX,f,c}$ field is omitted from the report. In some examples, the power headroom value field may indicate the power headroom value for a panel k, a type of the power headroom value (e.g., type 1, type 2, type 3, etc.), or any combination thereof.

At 530, the UE 115-*e* may transmit the report to the base station 105-*e*. In some examples, at 535 the base station 105-*e* may schedule resources based on the received report as described herein. For example, the base station 105-*e* may schedule subsequent communications with a first panel based on a power headroom value of the first panel indicated by the report, communications with a second panel based on a power headroom value of the second panel indicated by the report, or both, as described herein with reference to at least FIGS. 1-4.

Figure 6:
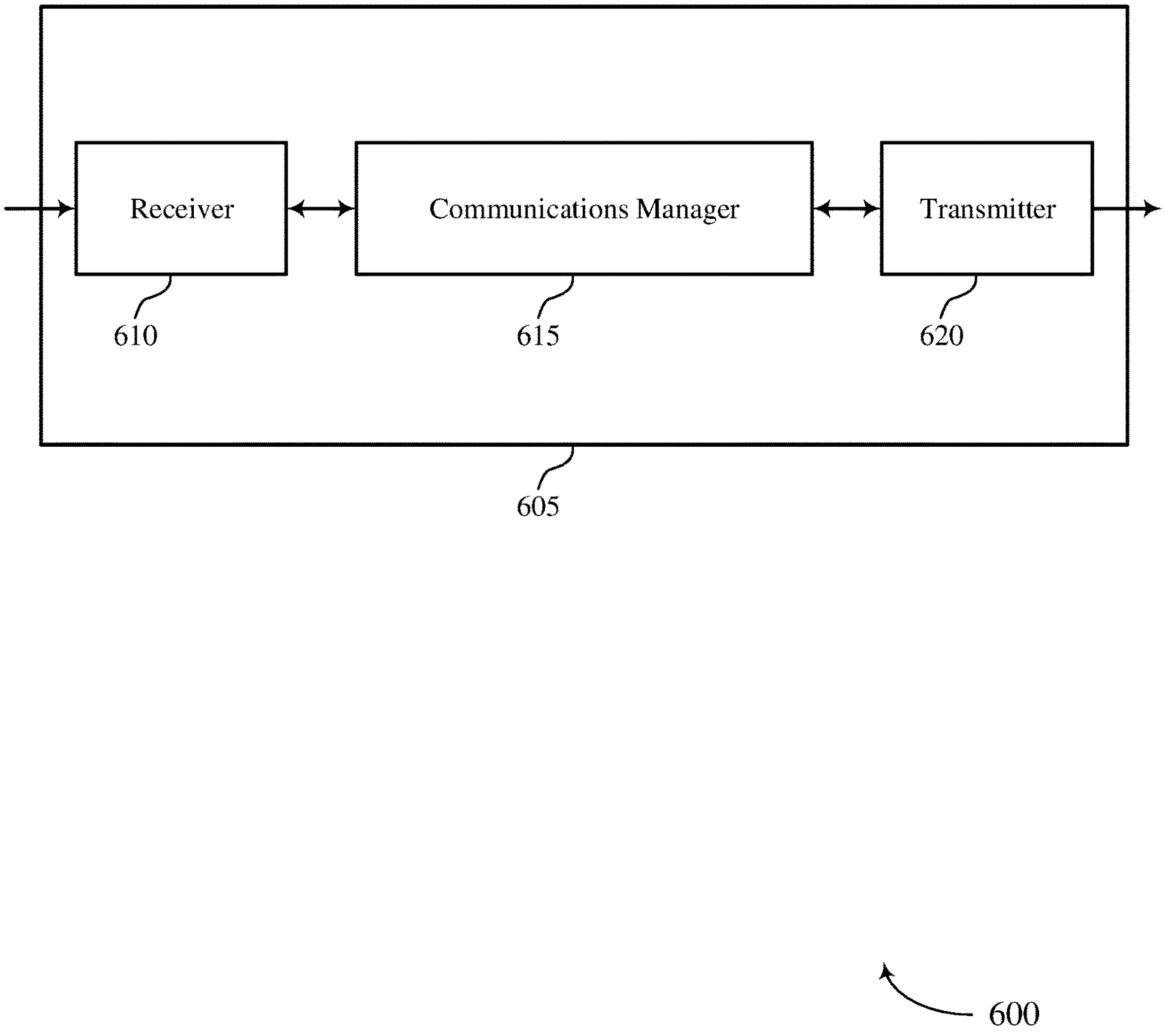
FIGS. 6 and 7 show block diagrams of devices that support multi-panel power reporting techniques in accordance with aspects of the present disclosure.

FIG. 6 shows a block diagram 600 of a device 605 that supports multi-panel power reporting techniques in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multi-panel power reporting techniques, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate via a first panel of the UE and a second panel of the UE, determine at least one of a first power headroom value for the first panel or a second power headroom value for the second panel, the first power headroom value being specific to the first panel and the second power headroom value being specific to the second panel, and transmit, to a base station, a report indicating at least one of the first power headroom value for the first panel or the second power headroom value for the second panel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may enable a UE 115 to transmit a multi-panel power headroom report. For example, the techniques may enable the UE 115 to calculate panel specific parameters and generate a report indicating one or more of the parameters as described herein. Such a report may enable the UE 115 to indicate panel specific power management events (e.g., MPE events) to a base station, which may enable more efficiency scheduling and communications in the system.

Based on implementing the techniques described herein, a processor of the UE 115 (e.g., a processor controlling the receiver 610, the communications manager 615, the transmitter 620, or a combination thereof) may report a power headroom for different panels, which may save power at the UE 115 (e.g., the UE may realize reduced power usage at a panel based on the report), among other advantages.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
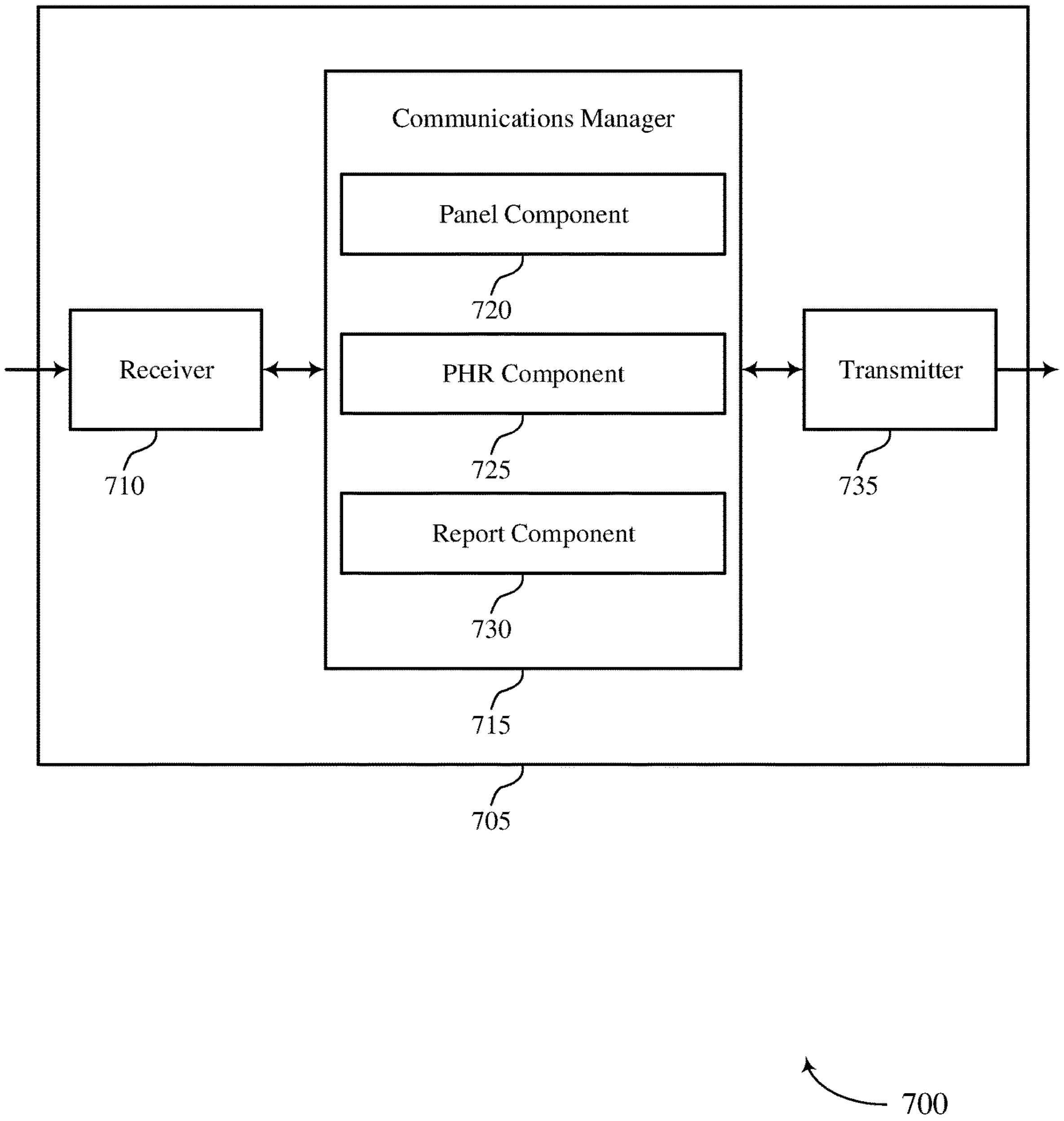

FIG. 7 shows a block diagram 700 of a device 705 that supports multi-panel power reporting techniques in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to multi-panel power reporting techniques, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a panel component 720, a PHR component 725, and a report component 730. The communications manager 715 may be an example of aspects of the communications manager 910 described herein.

The panel component 720 may communicate via a first panel of the UE and a second panel of the UE.

The PHR component 725 may determine at least one of a first power headroom value for the first panel or a second power headroom value for the second panel, the first power headroom value being specific to the first panel and the second power headroom value being specific to the second panel.

The report component 730 may transmit, to a base station, a report indicating at least one of the first power headroom value for the first panel or the second power headroom value for the second panel.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
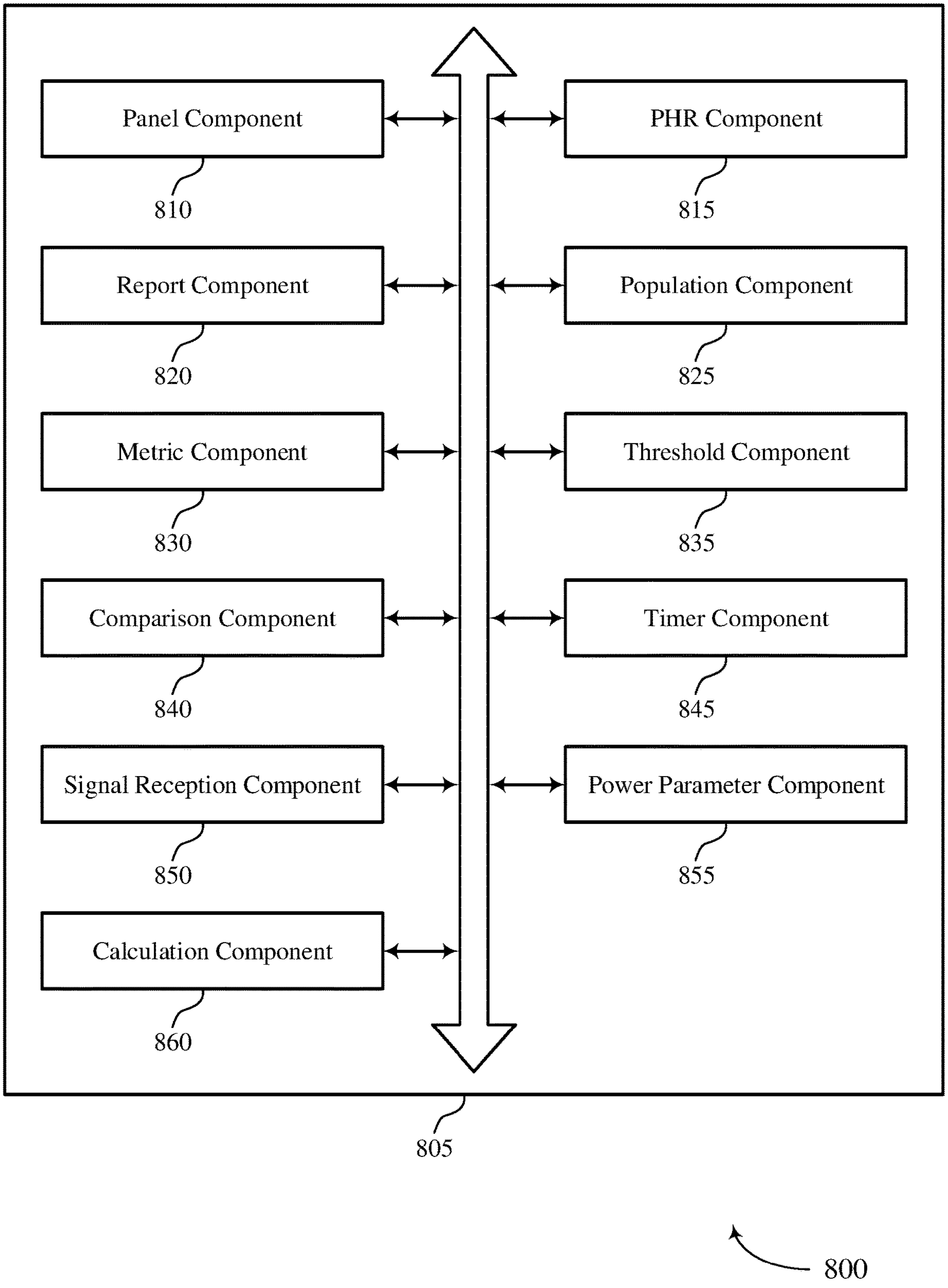
FIG. 8 shows a block diagram of a communications manager that supports multi-panel power reporting techniques in accordance with aspects of the present disclosure.

FIG. 8 shows a block diagram 800 of a communications manager 805 that supports multi-panel power reporting techniques in accordance with aspects of the present disclosure. The communications manager 805 may be an example of aspects of a communications manager 615, a communications manager 715, or a communications manager 910 described herein. The communications manager 805 may include a panel component 810, a PHR component 815, a report component 820, a population component 825, a metric component 830, a threshold component 835, a comparison component 840, a timer component 845, a signal reception component 850, a power parameter component 855, and a calculation component 860. Each of these modules may communicate, directly or indirectly, with one another (e.g., via one or more buses).

The panel component 810 may communicate via a first panel of the UE and a second panel of the UE.

The PHR component 815 may determine at least one of a first power headroom value for the first panel or a second power headroom value for the second panel, the first power headroom value being specific to the first panel and the second power headroom value being specific to the second panel.

The report component 820 may transmit, to a base station, a report indicating at least one of the first power headroom value for the first panel or the second power headroom value for the second panel.

The population component 825 may populate one or more fields of the report prior to transmission of the report, the one or more fields including a first field indicating whether the first power headroom value for the first panel is included in the report, and a second field indicating whether the second power headroom value for the second panel is included in the report. In some examples, the population component 825 may populate the report with at least one of the first power headroom value for the first panel or the second power headroom value for the second panel, where the report includes a first field for the first power headroom value and a second field for the second power headroom value.

The metric component 830 may identify one or more power backoff metrics including a first power backoff metric associated with the first panel, a second power backoff metric associated with the second panel, or both.

The threshold component 835 may determine that one or more thresholds are satisfied based on the identified one or more power backoff metrics, where transmitting the report is based on the satisfied one or more thresholds.

The comparison component 840 may compare a change of the one or more power backoff metrics to a change threshold of the one or more thresholds, where determining that the one or more thresholds are satisfied is based on the comparison. In some cases, the change of the one or more power backoff metrics includes a change of the first power backoff metric, a change of the second power backoff metric, a change of a sum of the first power backoff metric and the second power backoff metric, or any combination thereof.

The timer component 845 may determine an expiration of a timer associated with the report, where determining that the one or more thresholds are satisfied is based on the expiration of the timer.

The signal reception component 850 may receive a signal indicating uplink resources for a transmission from the UE, where determining that the one or more thresholds are satisfied is based on the received signal. In some examples, the signal reception component 850 may receive a signal indicating uplink resources for a transmission from the UE, where calculating the real transmission power is based on the indicated uplink resources.

The power parameter component 855 may identify a first maximum power parameter associated with the first panel based on a first power reduction parameter. In some examples, the power parameter component 855 may identify a second maximum power parameter associated with the second panel based on a second power reduction parameter different than the first power reduction parameter, where the first power reduction parameter corresponds to the first panel and the second power reduction parameter corresponds to the second panel.

The calculation component 860 may calculate the first power headroom value based on the first maximum power parameter. In some examples, the calculation component 860 may calculate the second power headroom value based on the first maximum power parameter, where the first maximum power parameter corresponds to both the first panel and the second panel. In some examples, the calculation component 860 may calculate the second power headroom value based on the second maximum power parameter. In some examples, the calculation component 860 may calculate a real transmission power or a virtual transmission power based on communicating via the first panel of the UE and the second panel of the UE, where determining at least one of the first power headroom value for the first panel or the second power headroom value for the second panel is based on the real transmission power or the virtual transmission power.

Figure 9:
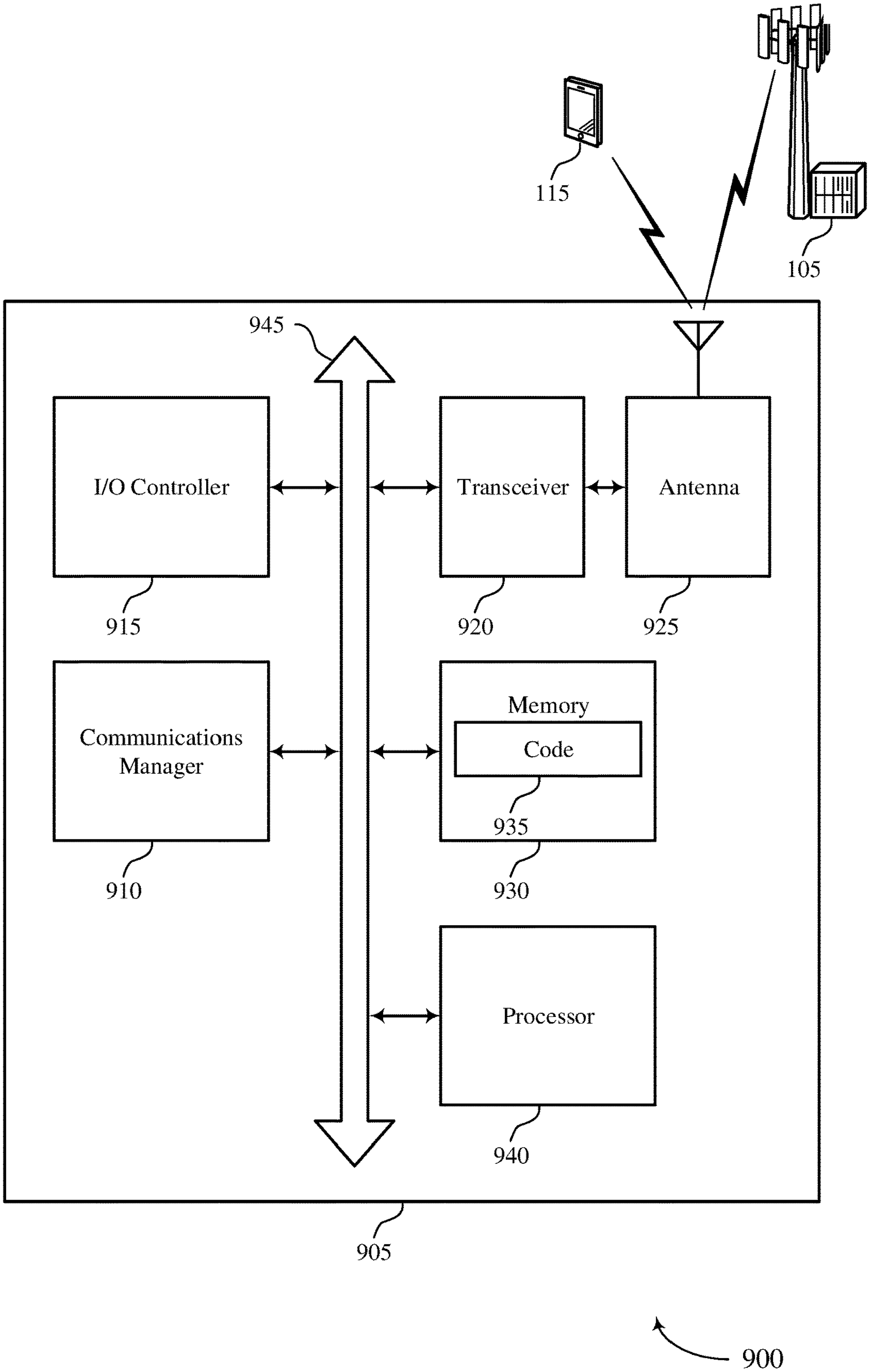
FIG. 9 shows a diagram of a system including a device that supports multi-panel power reporting techniques in accordance with aspects of the present disclosure.

FIG. 9 shows a diagram of a system 900 including a device 905 that supports multi-panel power reporting techniques in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate via a first panel of the UE and a second panel of the UE, determine at least one of a first power headroom value for the first panel or a second power headroom value for the second panel, the first power headroom value being specific to the first panel and the second power headroom value being specific to the second panel, and transmit, to a base station, a report indicating at least one of the first power headroom value for the first panel or the second power headroom value for the second panel.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-panel power reporting techniques).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
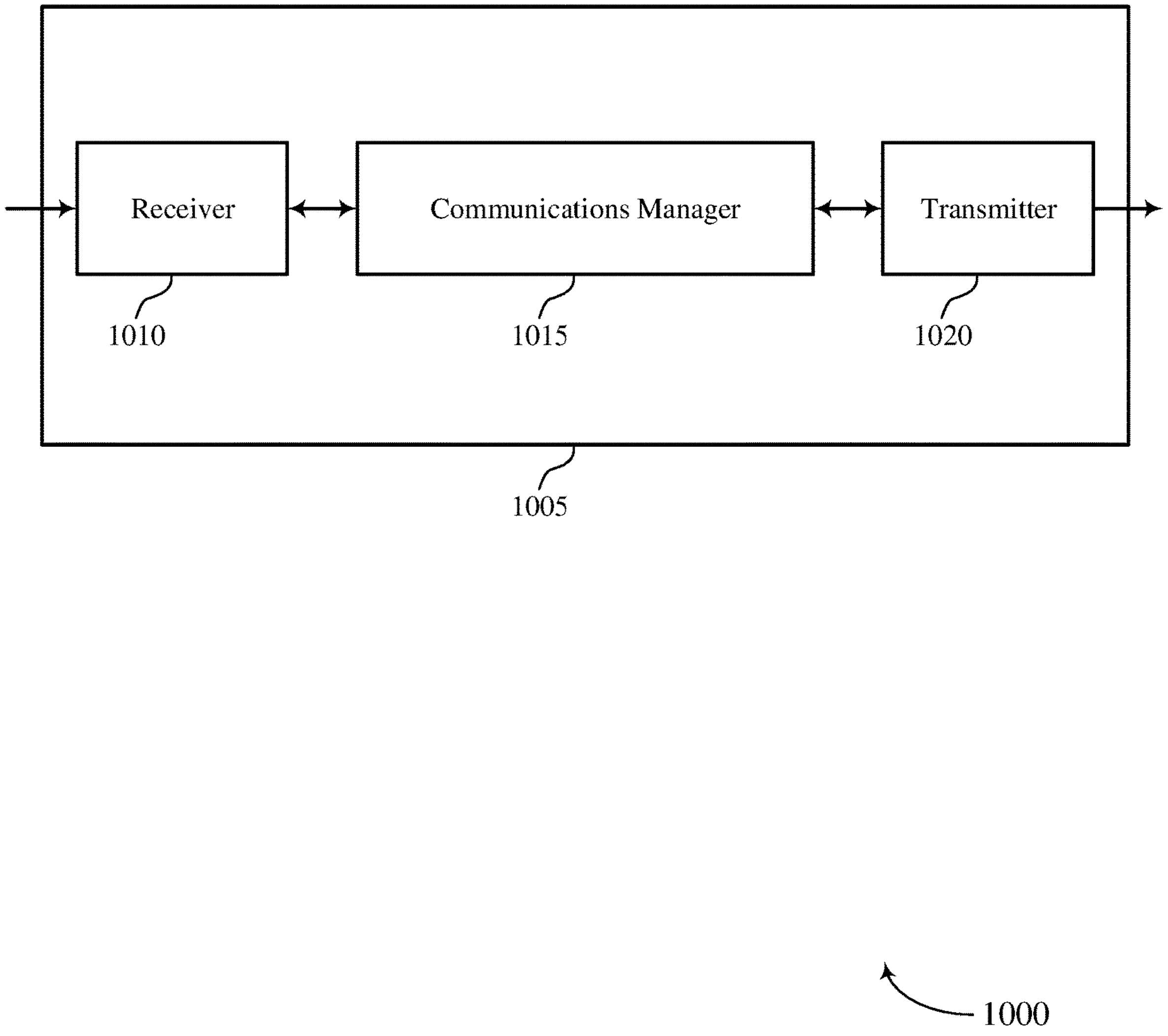
FIGS. 10 and 11 show block diagrams of devices that support multi-panel power reporting techniques in accordance with aspects of the present disclosure.

FIG. 10 shows a block diagram 1000 of a device 1005 that supports multi-panel power reporting techniques in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-panel power reporting techniques, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a first panel of a UE and a second panel of the UE and receive, from the UE, a report indicating at least one of a first power headroom value for the first panel or a second power headroom value for the second panel, the first power headroom value being specific to the first panel and the second power headroom value being specific to the second panel. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
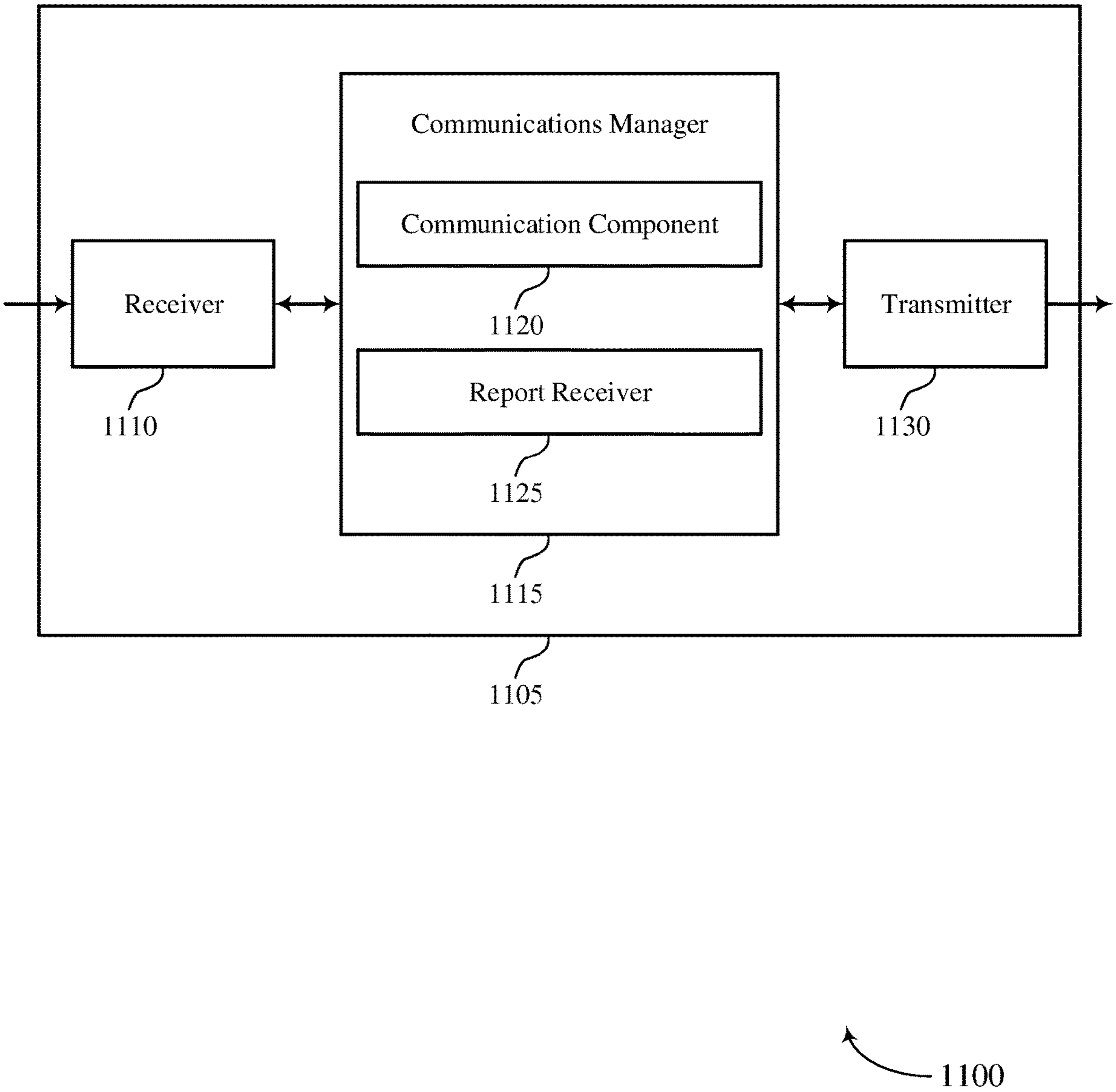

FIG. 11 shows a block diagram 1100 of a device 1105 that supports multi-panel power reporting techniques in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to multi-panel power reporting techniques, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a communication component 1120 and a report receiver 1125. The communications manager 1115 may be an example of aspects of the communications manager 1310 described herein.

The communication component 1120 may communicate with a first panel of a UE and a second panel of the UE.

The report receiver 1125 may receive, from the UE, a report indicating at least one of a first power headroom value for the first panel or a second power headroom value for the second panel, the first power headroom value being specific to the first panel and the second power headroom value being specific to the second panel.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
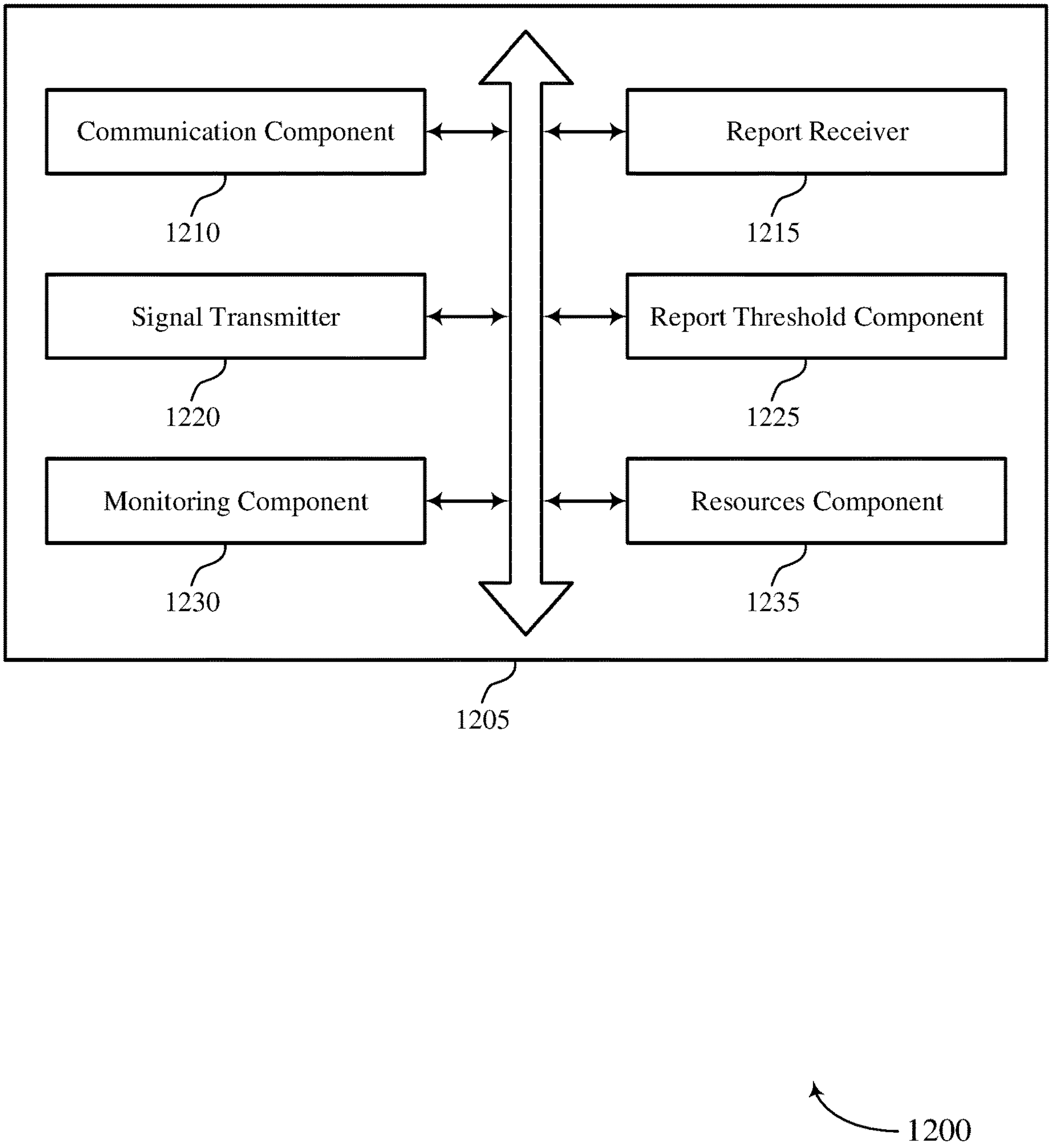
FIG. 12 shows a block diagram of a communications manager that supports multi-panel power reporting techniques in accordance with aspects of the present disclosure.

FIG. 12 shows a block diagram 1200 of a communications manager 1205 that supports multi-panel power reporting techniques in accordance with aspects of the present disclosure. The communications manager 1205 may be an example of aspects of a communications manager 1015, a communications manager 1115, or a communications manager 1310 described herein. The communications manager 1205 may include a communication component 1210, a report receiver 1215, a signal transmitter 1220, a report threshold component 1225, a monitoring component 1230, and a resources component 1235. Each of these modules may communicate, directly or indirectly, with one another (e.g., via one or more buses).

The communication component 1210 may communicate with a first panel of a UE and a second panel of the UE.

The report receiver 1215 may receive, from the UE, a report indicating at least one of a first power headroom value for the first panel or a second power headroom value for the second panel, the first power headroom value being specific to the first panel and the second power headroom value being specific to the second panel. In some cases, the report includes one or more fields associated with a component carrier, the one or more fields including a first field indicating whether the first power headroom value for the first panel is included in the report, and a second field indicating whether the second power headroom value for the second panel is included in the report. In some cases, the report includes a first field for the first power headroom value and a second field for the second power headroom value.

The signal transmitter 1220 may transmit, to the UE, a signal indicating a power adjustment for at least one of the first panel or the second panel in response to receiving the report. In some examples, the signal transmitter 1220 may transmit a signal indicating the uplink resources.

The report threshold component 1225 may identify that one or more thresholds associated with the report are satisfied, the one or more thresholds including an expiration of a timer associated with the report.

The monitoring component 1230 may monitor for the report based on the one or more thresholds being satisfied.

The resources component 1235 may identify uplink resources for a transmission from the UE to the base station.

Figure 13:
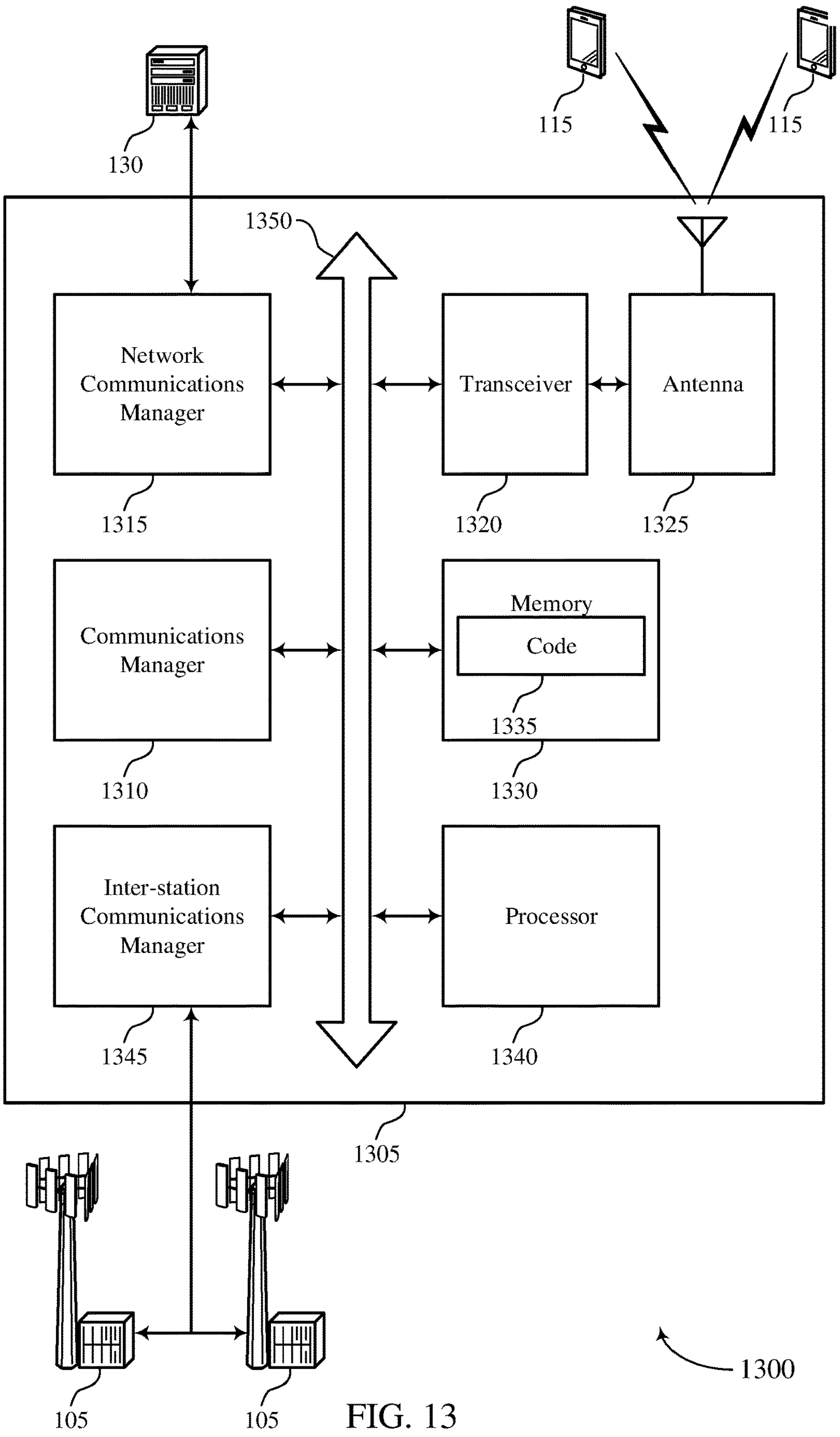
FIG. 13 shows a diagram of a system including a device that supports multi-panel power reporting techniques in accordance with aspects of the present disclosure.

FIG. 13 shows a diagram of a system 1300 including a device 1305 that supports multi-panel power reporting techniques in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate with a first panel of a UE and a second panel of the UE and receive, from the UE, a report indicating at least one of a first power headroom value for the first panel or a second power headroom value for the second panel, the first power headroom value being specific to the first panel and the second power headroom value being specific to the second panel.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting multi-panel power reporting techniques).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
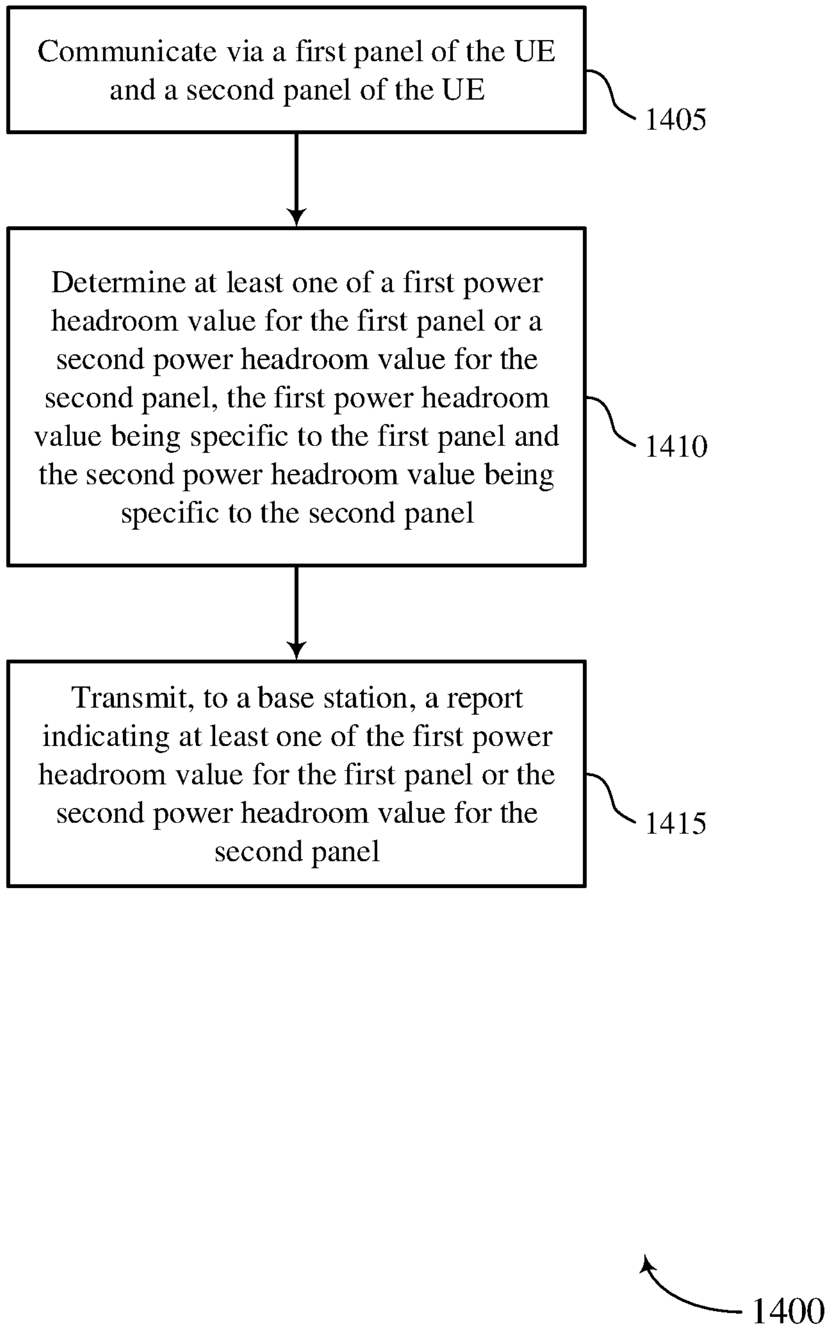
FIGS. 14 through 17 show flowcharts illustrating methods that support multi-panel power reporting techniques in accordance with aspects of the present disclosure.

FIG. 14 shows a flowchart illustrating a method 1400 that supports multi-panel power reporting techniques in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may communicate via a first panel of the UE and a second panel of the UE. The operations of 1405 may be performed according to the methods described herein. In some examples, aspects of the operations of 1405 may be performed by a panel component as described with reference to FIGS. 6 through 9.

At 1410, the UE may determine at least one of a first power headroom value for the first panel or a second power headroom value for the second panel, the first power headroom value being specific to the first panel and the second power headroom value being specific to the second panel. The operations of 1410 may be performed according to the methods described herein. In some examples, aspects of the operations of 1410 may be performed by a PHR component as described with reference to FIGS. 6 through 9.

At 1415, the UE may transmit, to a base station, a report indicating at least one of the first power headroom value for the first panel or the second power headroom value for the second panel. The operations of 1415 may be performed according to the methods described herein. In some examples, aspects of the operations of 1415 may be performed by a report component as described with reference to FIGS. 6 through 9.

Figure 15:
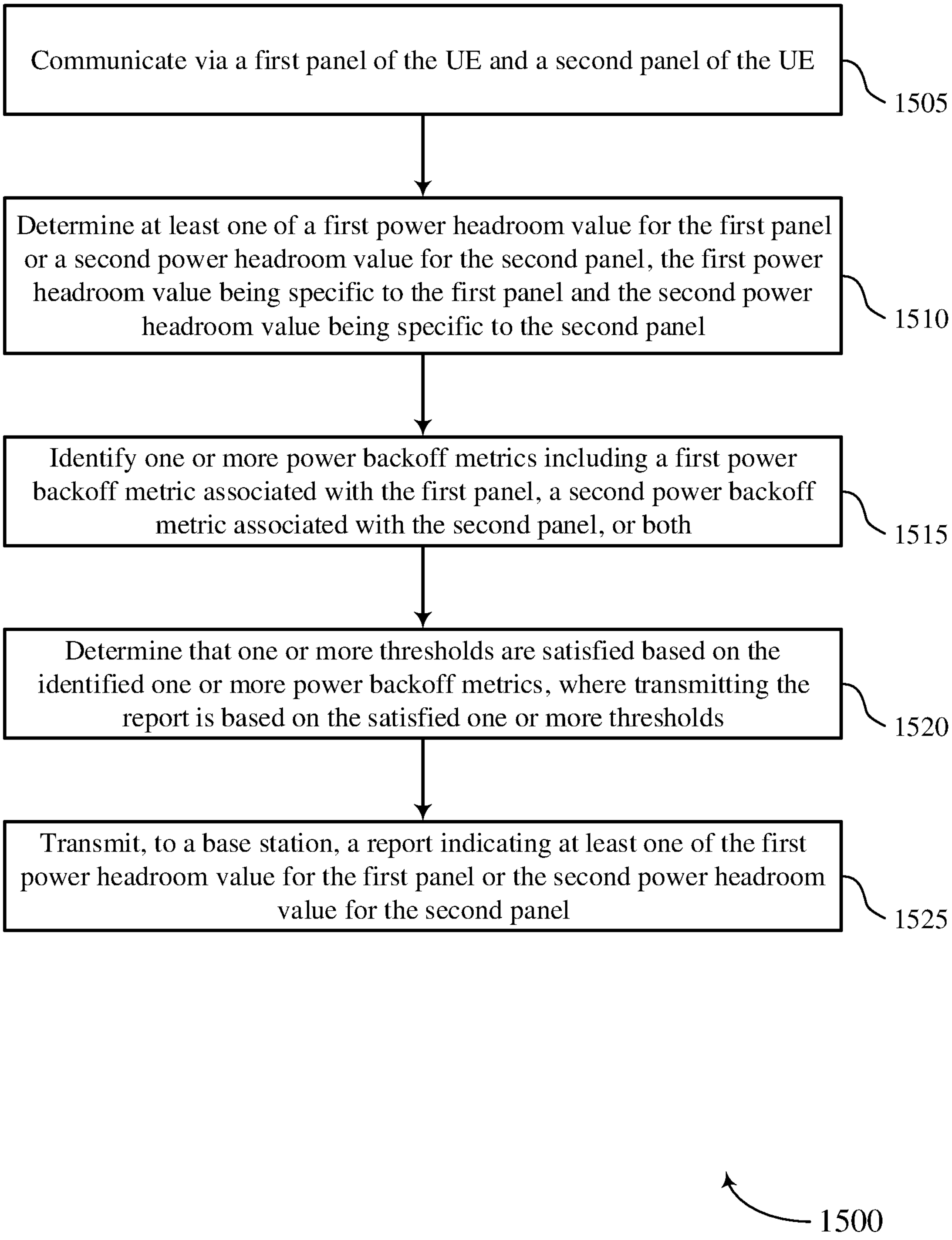

FIG. 15 shows a flowchart illustrating a method 1500 that supports multi-panel power reporting techniques in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may communicate via a first panel of the UE and a second panel of the UE. The operations of 1505 may be performed according to the methods described herein. In some examples, aspects of the operations of 1505 may be performed by a panel component as described with reference to FIGS. 6 through 9.

At 1510, the UE may determine at least one of a first power headroom value for the first panel or a second power headroom value for the second panel, the first power headroom value being specific to the first panel and the second power headroom value being specific to the second panel. The operations of 1510 may be performed according to the methods described herein. In some examples, aspects of the operations of 1510 may be performed by a PHR component as described with reference to FIGS. 6 through 9.

At 1515, the UE may identify one or more power backoff metrics including a first power backoff metric associated with the first panel, a second power backoff metric associated with the second panel, or both. The operations of 1515 may be performed according to the methods described herein. In some examples, aspects of the operations of 1515 may be performed by a metric component as described with reference to FIGS. 6 through 9.

At 1520, the UE may determine that one or more thresholds are satisfied based on the identified one or more power backoff metrics, where transmitting the report is based on the satisfied one or more thresholds. The operations of 1520 may be performed according to the methods described herein. In some examples, aspects of the operations of 1520 may be performed by a threshold component as described with reference to FIGS. 6 through 9.

At 1525, the UE may transmit, to a base station, a report indicating at least one of the first power headroom value for the first panel or the second power headroom value for the second panel. The operations of 1525 may be performed according to the methods described herein. In some examples, aspects of the operations of 1525 may be performed by a report component as described with reference to FIGS. 6 through 9.

Figure 16:
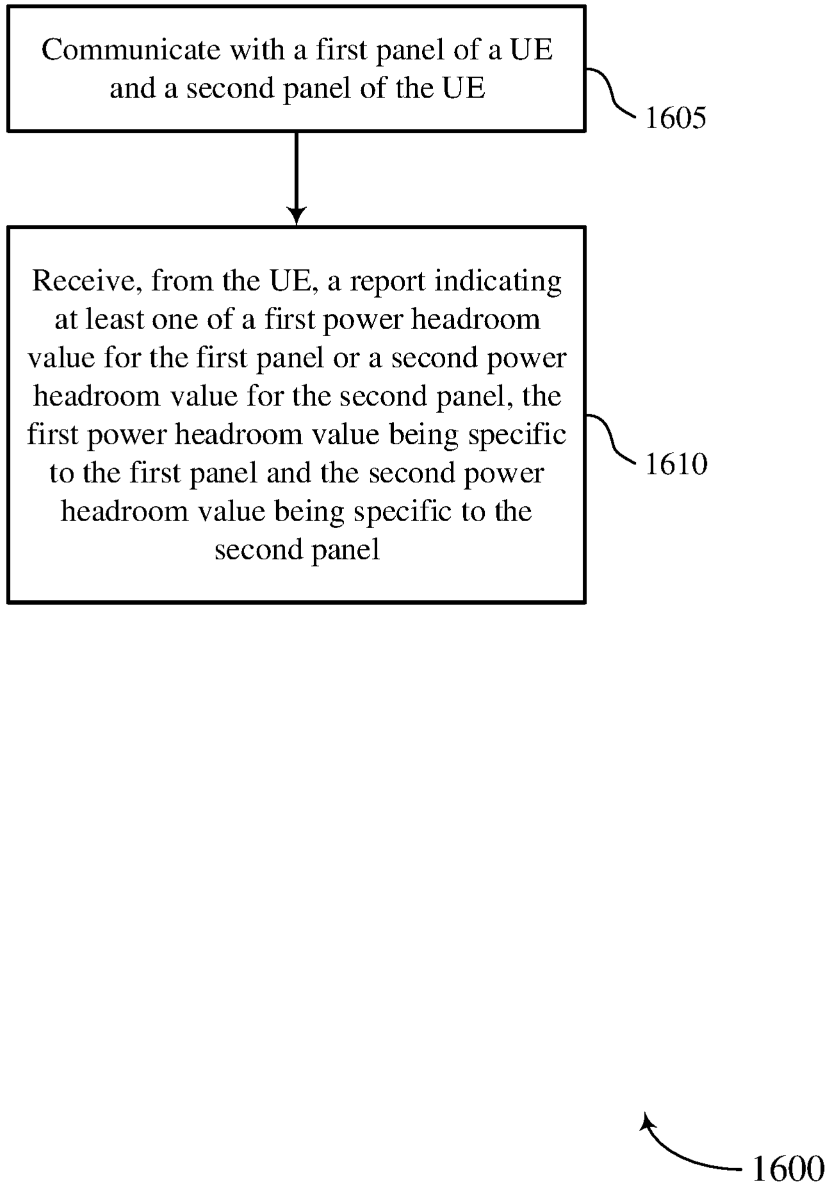

FIG. 16 shows a flowchart illustrating a method 1600 that supports multi-panel power reporting techniques in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may communicate with a first panel of a UE and a second panel of the UE. The operations of 1605 may be performed according to the methods described herein. In some examples, aspects of the operations of 1605 may be performed by a communication component as described with reference to FIGS. 10 through 13.

At 1610, the base station may receive, from the UE, a report indicating at least one of a first power headroom value for the first panel or a second power headroom value for the second panel, the first power headroom value being specific to the first panel and the second power headroom value being specific to the second panel. The operations of 1610 may be performed according to the methods described herein. In some examples, aspects of the operations of 1610 may be performed by a report receiver as described with reference to FIGS. 10 through 13.

Figure 17:
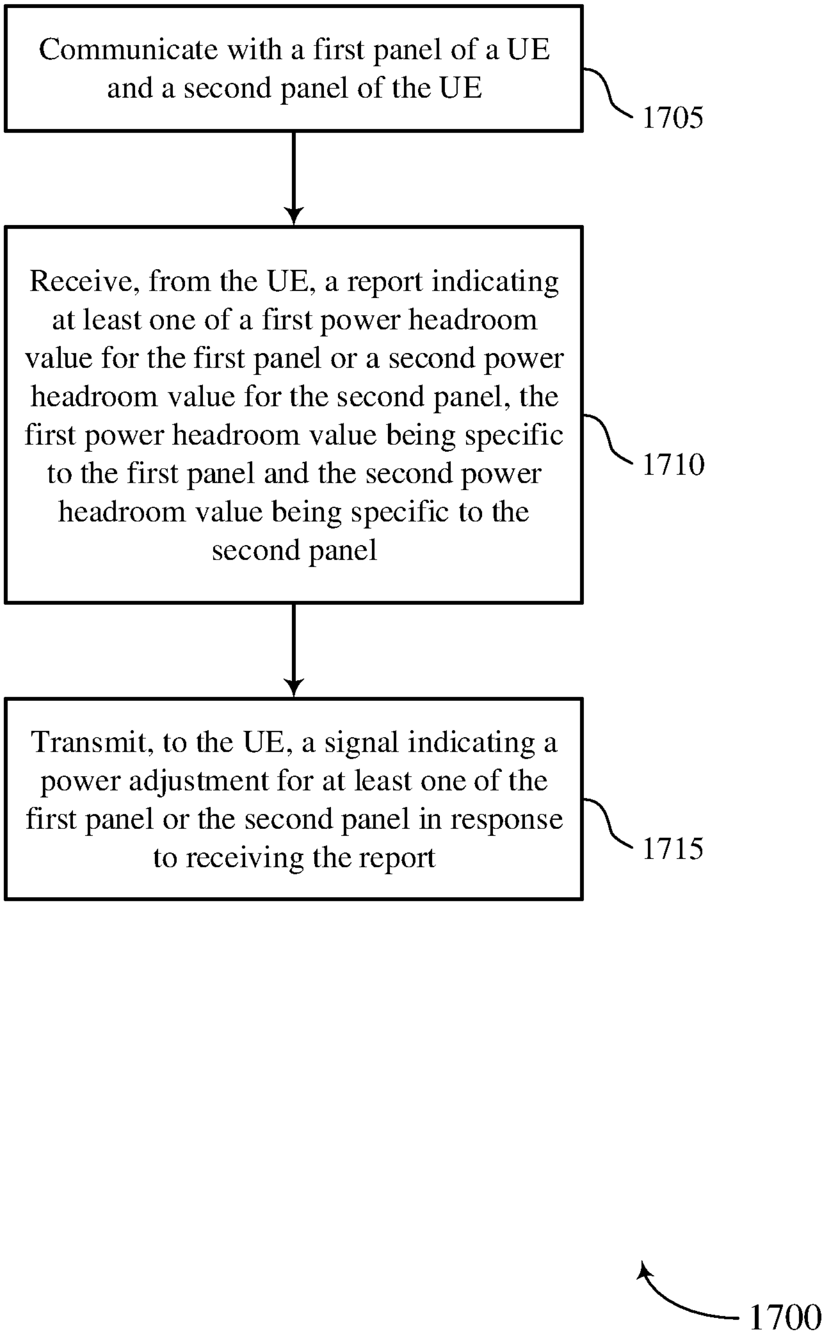

FIG. 17 shows a flowchart illustrating a method 1700 that supports multi-panel power reporting techniques in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may communicate with a first panel of a UE and a second panel of the UE. The operations of 1705 may be performed according to the methods described herein. In some examples, aspects of the operations of 1705 may be performed by a communication component as described with reference to FIGS. 10 through 13.

At 1710, the base station may receive, from the UE, a report indicating at least one of a first power headroom value for the first panel or a second power headroom value for the second panel, the first power headroom value being specific to the first panel and the second power headroom value being specific to the second panel. The operations of 1710 may be performed according to the methods described herein. In some examples, aspects of the operations of 1710 may be performed by a report receiver as described with reference to FIGS. 10 through 13.

At 1715, the base station may transmit, to the UE, a signal indicating a power adjustment for at least one of the first panel or the second panel in response to receiving the report. The operations of 1715 may be performed according to the methods described herein. In some examples, aspects of the operations of 1715 may be performed by a signal transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Example 1: A method of wireless communications at a UE, comprising: communicating via a first panel of the UE and a second panel of the UE, determining at least one of a first power headroom value for the first panel or a second power headroom value for the second panel, the first power headroom value being specific to the first panel and the second power headroom value being specific to the second panel, and transmitting, to a base station, a report indicating at least one of the first power headroom value for the first panel or the second power headroom value for the second panel.

Example 2: The method of example 1, further comprising: populating one or more fields of the report prior to transmission of the report, the one or more fields including a first field indicating whether the first power headroom value for the first panel is included in the report, and a second field indicating whether the second power headroom value for the second panel is included in the report.

Example 3: The method of examples 1 or 2, further comprising: populating the report with at least one of the first power headroom value for the first panel or the second power headroom value for the second panel, wherein the report includes a first field for the first power headroom value and a second field for the second power headroom value.

Example 4: The method of any of examples 1 to 3, further comprising: identifying one or more power backoff metrics comprising a first power backoff metric associated with the first panel, a second power backoff metric associated with the second panel, or both; and determining that one or more thresholds are satisfied based at least in part on the identified one or more power backoff metrics, wherein transmitting the report is based at least in part on the satisfied one or more thresholds.

Example 5: The method of any of examples 1 to 4, further comprising: comparing a change of the one or more power backoff metrics to a change threshold of the one or more thresholds, wherein determining that the one or more thresholds are satisfied is based at least in part on the comparison.

Example 6: The method of any of examples 1 to 5, wherein the change of the one or more power backoff metrics comprises a change of the first power backoff metric, a change of the second power backoff metric, a change of a sum of the first power backoff metric and the second power backoff metric, or any combination thereof.

Example 7: The method of any of examples 1 to 6, further comprising: determining an expiration of a timer associated with the report, wherein determining that the one or more thresholds are satisfied is based at least in part on the expiration of the timer.

Example 8: The method of any of examples 1 to 7, further comprising: receiving a signal indicating uplink resources for a transmission from the UE, wherein determining that the one or more thresholds are satisfied is based at least in part on the received signal.

Example 9: The method of any of examples 1 to 8, wherein determining at least one of the first power headroom value or the second power headroom value comprises: identifying a first maximum power parameter associated with the first panel based at least in part on a first power reduction parameter; and calculating the first power headroom value based at least in part on the first maximum power parameter.

Example 10: The method of any of examples 1 to 9, further comprising: calculating the second power headroom value based at least in part on the first maximum power parameter, wherein the first maximum power parameter corresponds to both the first panel and the second panel.

Example 11: The method of any of examples 1 to 10, further comprising: identifying a second maximum power parameter associated with the second panel based at least in part on a second power reduction parameter different than the first power reduction parameter, wherein the first power reduction parameter corresponds to the first panel and the second power reduction parameter corresponds to the second panel; and calculating the second power headroom value based at least in part on the second maximum power parameter.

Example 12: The method of any of examples 1 to 11, further comprising: calculating a real transmission power or a virtual transmission power based at least in part on communicating via the first panel of the UE and the second panel of the UE, wherein determining at least one of the first power headroom value for the first panel or the second power headroom value for the second panel is based at least in part on the real transmission power or the virtual transmission power.

Example 13: The method of any of examples 1 to 12, further comprising: receiving a signal indicating uplink resources for a transmission from the UE, wherein calculating the real transmission power is based at least in part on the indicated uplink resources.

Example 14: An apparatus comprising at least one means for performing a method of any of examples 1 to 13.

Example 15: An apparatus for wireless communications comprising a processor; memory in electronic communication with the processor; and instructions stored in the memory and executable by the processor to cause the apparatus to perform a method of any of examples 1 to 13.

Example 16: A non-transitory computer-readable medium storing code for wireless communications, the code comprising instructions executable by a processor to perform a method of any of embodiments 1 to 13.

Example 17: A method of wireless communications at a base station, comprising: communicating with a first panel of a user equipment (UE) and a second panel of the UE; and receiving, from the UE, a report indicating at least one of a first power headroom value for the first panel or a second power headroom value for the second panel, the first power headroom value being specific to the first panel and the second power headroom value being specific to the second panel.

Example 18: The method of example 17, further comprising: transmitting, to the UE, a signal indicating a power adjustment for at least one of the first panel or the second panel in response to receiving the report.

Example 19: The method of examples 17 or 18, wherein the report includes one or more fields associated with a component carrier, the one or more fields including a first field indicating whether the first power headroom value for the first panel is included in the report, and a second field indicating whether the second power headroom value for the second panel is included in the report.

Example 20: The method of any of examples 17 to 19, wherein the report includes a first field for the first power headroom value and a second field for the second power headroom value.

Example 21: The method of any of examples 17 to 20, further comprising: identifying that one or more thresholds associated with the report are satisfied, the one or more thresholds comprising an expiration of a timer associated with the report; and monitoring for the report based at least in part on the one or more thresholds being satisfied.

Example 22: The method of any of examples 17 to 21, further comprising: identifying uplink resources for a transmission from the UE to the base station; and transmitting a signal indicating the uplink resources.

Example 23: An apparatus comprising at least one means for performing a method of any of examples 17 to 22.

Example 24: An apparatus for wireless communications comprising a processor; memory in electronic communication with the processor; and instructions stored in the memory and executable by the processor to cause the apparatus to perform a method of any of examples 17 to 22.

Example 25: A non-transitory computer-readable medium storing code for wireless communications, the code comprising instructions executable by a processor to perform a method of any of embodiments 17 to 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

communicating via a first panel of the UE and a second panel of the UE;

receiving control signaling indicating a first maximum power parameter associated with the first panel based at least in part on a first power reduction parameter;

calculating a first power headroom value based at least in part on the first maximum power parameter;

identifying a second maximum power parameter associated with the second panel based at least in part on a second power reduction parameter different than the first power reduction parameter, wherein the first power reduction parameter corresponds to the first panel and the second power reduction parameter corresponds to the second panel;

calculating a second power headroom value based at least in part on the second maximum power parameter;

populating one or more fields of a report, the one or more fields comprising a first field indicating the first power headroom value for the first panel, a second field indicating the second power headroom value for the second panel, a third field indicating that the first power headroom value for the first panel is included in the report, and a fourth field indicating that the second power headroom value for the second panel is included in the report, the first power headroom value being specific to the first panel and the second power headroom value being specific to the second panel; and transmitting the report comprising the first field indicating the first power headroom value for the first panel, the second field indicating the second power headroom value for the second panel, the third field indicating that the first power headroom value for the first panel is included in the report, and the fourth field indicating that the second power headroom value for the second panel is included in the report.

2. The method of claim 1, further comprising:

identifying one or more power backoff metrics comprising a first power backoff metric associated with the first panel, a second power backoff metric associated with the second panel, or both; and determining that one or more thresholds are satisfied based at least in part on the identified one or more power backoff metrics, wherein transmitting the report is based at least in part on the satisfied one or more thresholds.

3. The method of claim 2, further comprising:

comparing a change of the one or more power backoff metrics to a change threshold of the one or more thresholds, wherein determining that the one or more thresholds are satisfied is based at least in part on the comparison.

4. The method of claim 3, wherein the change of the one or more power backoff metrics comprises a change of the first power backoff metric, a change of the second power backoff metric, a change of a sum of the first power backoff metric and the second power backoff metric, or any combination thereof.

5. The method of claim 2, further comprising:

determining an expiration of a timer associated with the report, wherein determining that the one or more thresholds are satisfied is based at least in part on the expiration of the timer.

6. The method of claim 1, further comprising:

calculating the second power headroom value based at least in part on the first maximum power parameter, wherein the first maximum power parameter corresponds to both the first panel and the second panel.

7. An apparatus for wireless communications at a user equipment (UE), comprising:

one or more memories storing processor-executable code; and one or more processors coupled with the one or more memories and individually or collectively operable to execute the code to cause the apparatus to:

communicate via a first panel of the UE and a second panel of the UE;

receive control signaling indicating a first maximum power parameter associated with the first panel based at least in part on a first power reduction parameter;

calculate a first power headroom value based at least in part on the first maximum power parameter;

identify a second maximum power parameter associated with the second panel based at least in part on a second power reduction parameter different than the first power reduction parameter, wherein the first power reduction parameter corresponds to the first panel and the second power reduction parameter corresponds to the second panel;

calculate a second power headroom value based at least in part on the second maximum power parameter;

populate one or more fields of a report, the one or more fields comprising a first field indicating the first power headroom value for the first panel a second field indicating the second power headroom value for the second panel, a third field indicating that the first power headroom value for the first panel is included in the report, and a fourth field indicating that the second power headroom value for the second panel is included in the report, the first power headroom value being specific to the first panel and the second power headroom value being specific to the second panel; and transmit the report comprising the first field indicating the first power headroom value for the first panel, the second field indicating the second power headroom value for the second panel, the third field indicating that the first power headroom value for the first panel is included in the report, and the fourth field indicating that the second power headroom value for the second panel is included in the report.

8. The apparatus of claim 7, wherein the one or more processors are individually or collectively further operable to execute the code to cause the apparatus to:

identify one or more power backoff metrics comprising a first power backoff metric associated with the first panel, a second power backoff metric associated with the second panel, or both; and determine that one or more thresholds are satisfied based at least in part on the identified one or more power backoff metrics, wherein transmitting the report is based at least in part on the satisfied one or more thresholds.

9. The apparatus of claim 8, wherein the one or more processors are individually or collectively further operable to execute the code to cause the apparatus to:

compare a change of the one or more power backoff metrics to a change threshold of the one or more thresholds, wherein determining that the one or more thresholds are satisfied is based at least in part on the comparison.

10. The apparatus of claim 9, wherein the change of the one or more power backoff metrics comprises a change of the first power backoff metric, a change of the second power backoff metric, a change of a sum of the first power backoff metric and the second power backoff metric, or any combination thereof.

11. The apparatus of claim 8, wherein the one or more processors are individually or collectively further operable to execute the code to cause the apparatus to:

determine an expiration of a timer associated with the report, wherein determining that the one or more thresholds are satisfied is based at least in part on the expiration of the timer.

12. The apparatus of claim 8, wherein the one or more processors are individually or collectively further operable to execute the code to cause the apparatus to:

receive a signal indicating uplink resources for a transmission from the UE, wherein determining that the one or more thresholds are satisfied is based at least in part on the received signal.

13. The apparatus of claim 7, wherein the one or more processors are individually or collectively further operable to execute the code to cause the apparatus to:

calculate the second power headroom value based at least in part on the first maximum power parameter, wherein the first maximum power parameter corresponds to both the first panel and the second panel.

14. The apparatus of claim 7, wherein the one or more processors are individually or collectively further operable to execute the code to cause the apparatus to:

calculate a real transmission power or a virtual transmission power based at least in part on communicating via the first panel of the UE and the second panel of the UE, wherein the first power headroom value for the first panel and the second power headroom value for the second panel are based at least in part on the real transmission power or the virtual transmission power.

15. The apparatus of claim 14, wherein the one or more processors are individually or collectively further operable to execute the code to cause the apparatus to:

receive a signal indicating uplink resources for a transmission from the UE, wherein calculating the real transmission power is based at least in part on the indicated uplink resources.

16. An apparatus for wireless communications at a user equipment (UE), comprising:

means for communicating via a first panel of the UE and a second panel of the UE;

means for receiving control signaling indicating a first maximum power parameter associated with the first panel based at least in part on a first power reduction parameter;

means for calculating a first power headroom value based at least in part on the first maximum power parameter;

means for identifying a second maximum power parameter associated with the second panel based at least in part on a second power reduction parameter different than the first power reduction parameter, wherein the first power reduction parameter corresponds to the first panel and the second power reduction parameter corresponds to the second panel;

means for calculating a second power headroom value based at least in part on the second maximum power parameter;

means for populating one or more fields of a report, the one or more fields comprising a first field indicating the first power headroom value for the first panel, a second field indicating the second power headroom value for the second panel, a third field indicating that the first power headroom value for the first panel is included in the report, and a fourth field indicating that the second power headroom value for the second panel is included in the report, the first power headroom value being specific to the first panel and the second power headroom value being specific to the second panel; and means for transmitting the report comprising the first field indicating the first power headroom value for the first panel, the second field indicating the second power headroom value for the second panel, the third field indicating that the first power headroom value for the first panel is included in the report, and the fourth field indicating that the second power headroom value for the second panel is included in the report.

17. The apparatus of claim 16, further comprising:

means for calculating the second power headroom value based at least in part on the first maximum power parameter, wherein the first maximum power parameter corresponds to both the first panel and the second panel.

18. The apparatus of claim 16, further comprising:

means for identifying one or more power backoff metrics comprising a first power backoff metric associated with the first panel, a second power backoff metric associated with the second panel, or both; and means for determining that one or more thresholds are satisfied based at least in part on the identified one or more power backoff metrics, wherein transmitting the report is based at least in part on the satisfied one or more thresholds.

19. The apparatus of claim 18, further comprising:

means for comparing a change of the one or more power backoff metrics to a change threshold of the one or more thresholds, wherein determining that the one or more thresholds are satisfied is based at least in part on the comparison.

20. The apparatus of claim 19, wherein the change of the one or more power backoff metrics comprises a change of the first power backoff metric, a change of the second power backoff metric, a change of a sum of the first power backoff metric and the second power backoff metric, or any combination thereof.

21. The apparatus of claim 18, further comprising:

means for determining an expiration of a timer associated with the report, wherein determining that the one or more thresholds are satisfied is based at least in part on the expiration of the timer.

* * * * *